United States Patent
Hayashikawa et al.

(10) Patent No.: US 6,944,200 B2
(45) Date of Patent: Sep. 13, 2005

(54) LASER OSCILLATOR

(75) Inventors: Hiroyuki Hayashikawa, Osaka (JP); Hitoshi Hongu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 17 days.

(21) Appl. No.: 10/680,243

(22) Filed: Oct. 8, 2003

(65) Prior Publication Data

US 2004/0066825 A1 Apr. 8, 2004

Related U.S. Application Data

(62) Division of application No. 10/048,226, filed as application No. PCT/JP00/03447 on May 13, 2002.

(51) Int. Cl.[7] .................................................. H01S 3/22
(52) U.S. Cl. .......................................... 372/55; 372/61
(58) Field of Search .............................. 372/55, 61, 56, 372/57, 58, 59, 60

(56) References Cited

U.S. PATENT DOCUMENTS

| | | | | |
|---|---|---|---|---|
| 928,902 A | * | 7/1909 | Christie | 356/18 |
| 3,619,811 A | * | 11/1971 | Kaiser et al. | 372/107 |
| 3,783,407 A | | 1/1974 | Mefferd et al. | |
| 3,808,553 A | * | 4/1974 | Locke et al. | 372/107 |
| 4,287,487 A | | 9/1981 | Kuwabara et al. | |
| 4,573,162 A | * | 2/1986 | Bakowsky et al. | 372/61 |
| 4,646,310 A | * | 2/1987 | Koseki | 372/58 |
| 5,426,659 A | * | 6/1995 | Sugiyama et al. | 372/58 |
| 6,600,760 B1 | * | 7/2003 | Green et al. | 372/20 |

FOREIGN PATENT DOCUMENTS

| | | |
|---|---|---|
| JP | 49-84191 | 8/1974 |
| JP | 55-4957 | 1/1980 |
| JP | 57-97689 | 6/1982 |
| JP | 60-24082 | 2/1985 |
| JP | 60-16187 | 8/1985 |
| JP | 62-237781 | 10/1987 |
| JP | 63-227075 | 9/1988 |
| JP | 63-302583 | 12/1988 |
| JP | 01 103889 | 4/1989 |
| JP | 1-103889 | 4/1989 |
| JP | 2-21678 | 1/1990 |
| JP | 2-129976 | 5/1990 |
| JP | 2-168683 | 6/1990 |
| JP | 2-208984 | 8/1990 |
| JP | 4-63667 | 5/1992 |
| JP | 5-206544 | 8/1993 |
| JP | 5-235439 | 9/1993 |
| JP | 06 326379 | 11/1994 |
| JP | 7-38176 | 2/1995 |
| JP | 7-142787 | 6/1995 |

OTHER PUBLICATIONS

Patent Abstracts of Japan, vol. 014, No. 502 (E–0997), Nov. 2, 1990 & JP 02 208984 A (Amanda Co., Ltd.), Aug. 20, 1990, Abstract, Figure 1.

* cited by examiner

*Primary Examiner*—Minsun Oh Harvey
*Assistant Examiner*—Tuan N. Nguyen
(74) *Attorney, Agent, or Firm*—Wenderoth, Lind & Ponack, L.L.P.

(57) ABSTRACT

A support unit for supporting an OPM holder so as to be perpendicular to a laser beam axis is disposed in the lower part of the OPM holder. A rotary shaft is inserted into the support unit and rotary shaft support unit, and the OPM holder and DT base are assembled together. Thus, a rotation support unit is composed. The rotation support unit has a degree of freedom in the rotating direction. On the other hand, in the lower part of an RM holder, a support bar is provided. At the DT base, a rotating element and a rotating element support unit supporting the rotating element are composed so as to support the support bar. Thus, a slider structure slidable in the optical axis direction is formed.

5 Claims, 25 Drawing Sheets

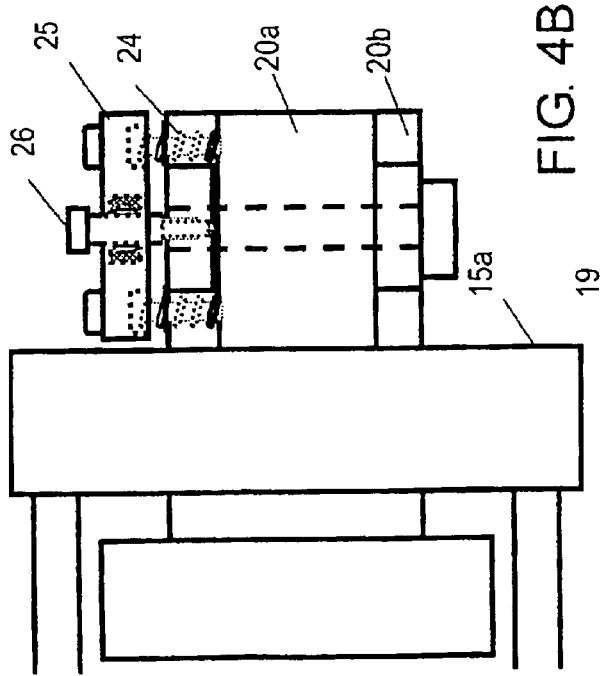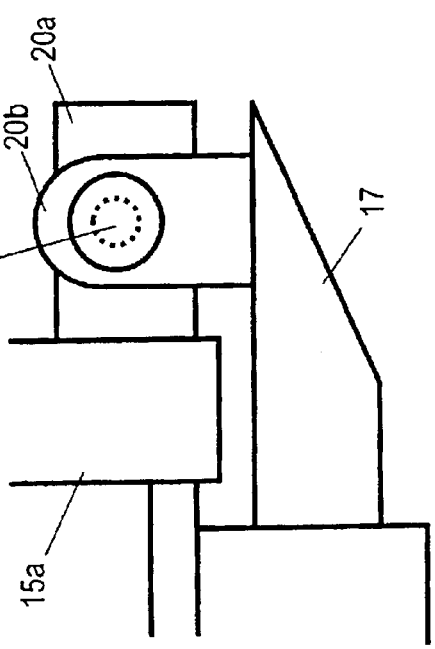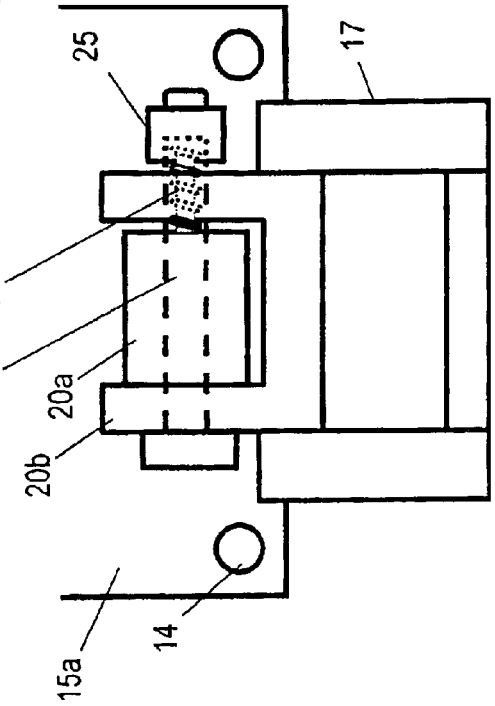

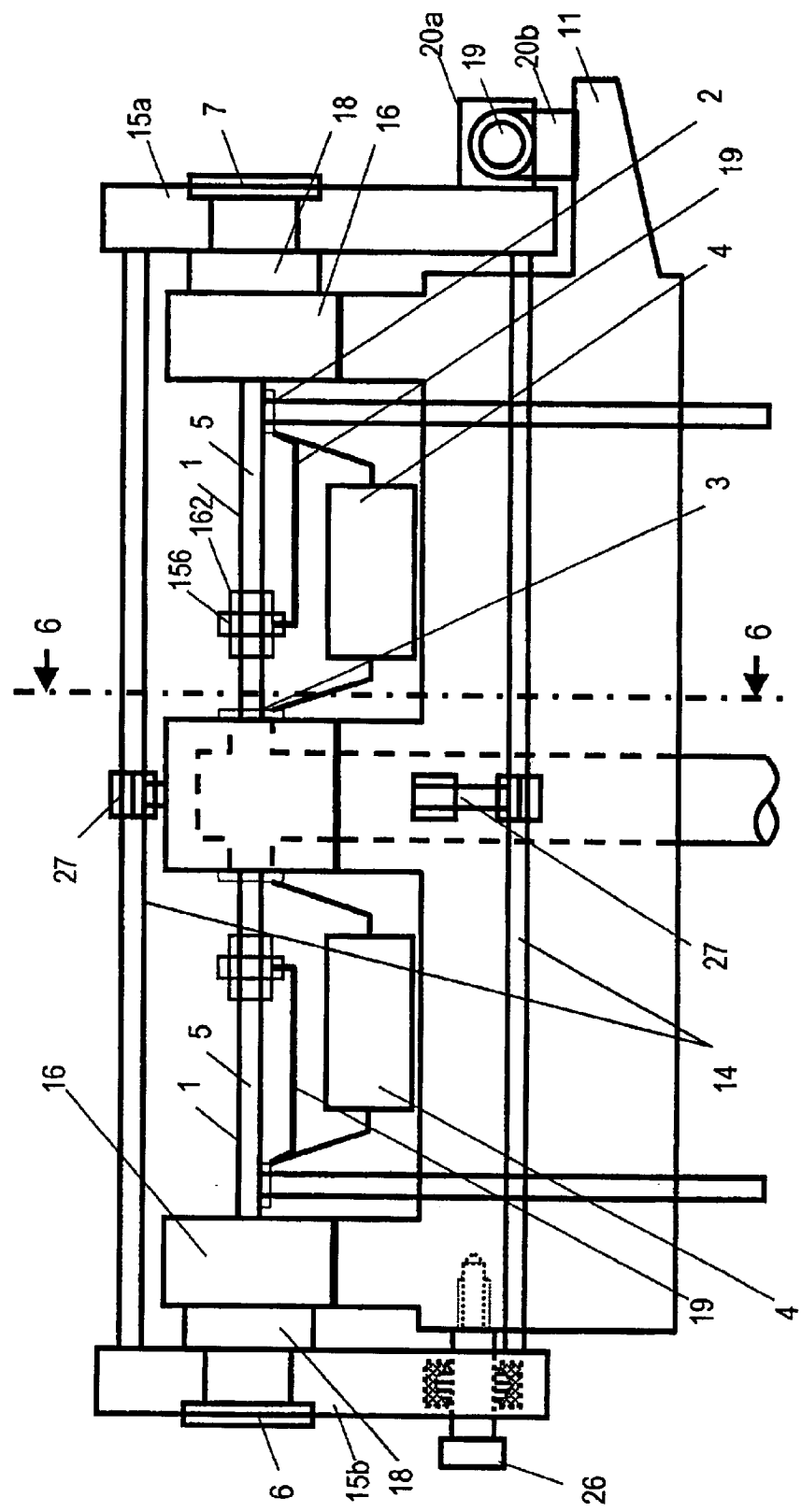

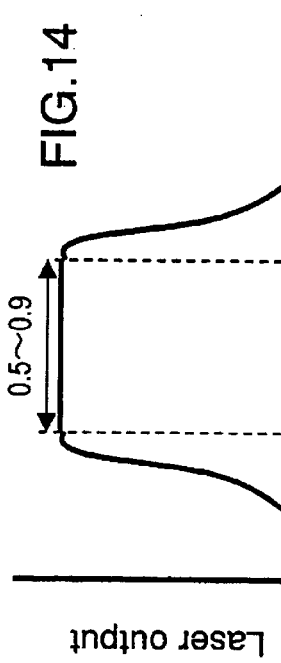
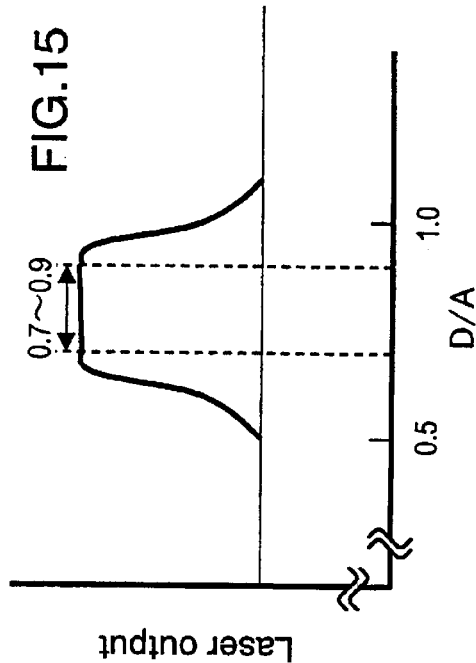
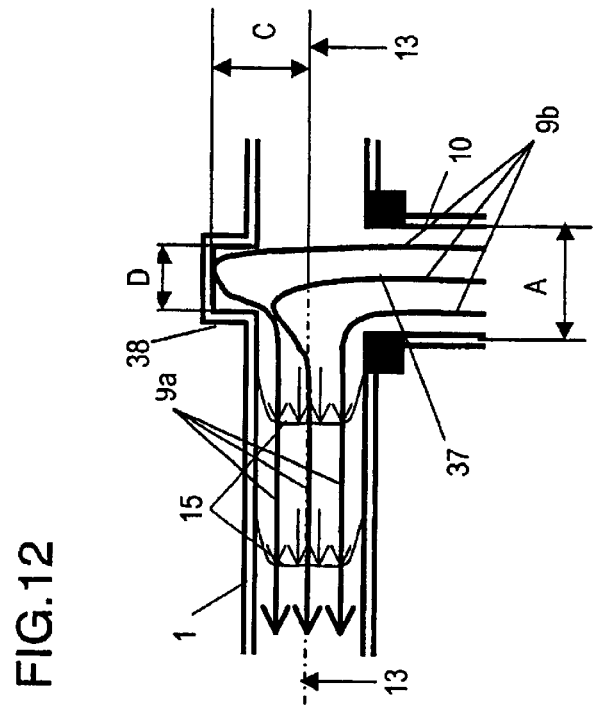
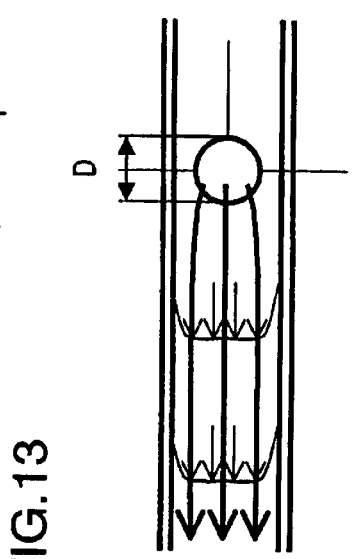

LASER OSCILLATOR

This application is a Divisional Application of Ser. No. 10/048,226 filed May 13, 2002 currently pending, which is a 371 of PCT/JP00/03447 filed May 30, 2000, also pending.

TECHNICAL FIELD

The present invention relates to a laser oscillator, and more particularly to an axial flow type gas laser oscillator having a discharge tube disposed in the optical axis direction.

BACKGROUND ART

FIG. 25 shows an example of a schematic configuration of a so called axial flow type gas laser oscillator. Referring to FIG. 25, the axial flow gas laser oscillator (hereinafter called AFGLO) is explained.

As shown in FIG. 25, the AFGLO is mainly composed of a laser resonator, a power supply unit 4, and a laser gas circulation part.

The laser resonator is composed of a discharge tube 1 having a discharge space 5, a rear mirror (hereinafter called RM) 6, and an output mirror (hereinafter called OPM) 7. The discharge tube (hereinafter called DT) 1 is composed of glass or other dielectric materials, and electrodes 2, 3 are disposed near both ends of the DT 1. In the DT 1 between the electrodes 2 and 3 the discharge space hereinafter called DA) 5 is placed. The RM 6 and OPM 7 are disposed to enclose a plurality of DAs 5. The RM 6 is a reflector having a reflectivity of nearly 100%. The OPM 7 is a partial reflector, and a laser beam 8 is emitted from the OPM 7.

The power supply unit 4 is connected to the electrodes 2, 3 to perform a discharge in the DA 5.

The laser gas circulation part (hereinafter called LGCP) is composed of a blower 13, heat exchangers 11, 12, a laser gas passage 10, and a plurality of DAs 5 in DTs 1. The laser gas circulates in the LGCP composing the AFGLO in a direction of arrow 9. The blower 13 is for circulating the laser gas. By this blower 13, the flow velocity of laser gas is set at about 100 m/sec in the DA 5. The pressure in the LGCP is about 100 to 200 Torr. When a specified voltage is applied to the electrodes 2, 3 from the power supply unit 4, the DA 5 discharges. By this discharge and operation of the blower, the temperature of the laser gas elevates. The heat exchangers 11 and 12 are provided to cool the laser gas raised in temperature.

Described above is the configuration of the conventional AFGLO, and its operation is explained below.

The laser gas sent out from the blower 13 is guided into the DT 1 through the laser gas passage 10. In this state, when a specified voltage is applied to the electrodes 2, 3 from the power supply unit 4, the DA 5 discharges. The laser gas in the DA 5 obtains this discharge energy and is excited. The excited laser gas becomes a resonant state in the laser resonator formed of the RM 6 and OPM 7. As a result, a laser beam 8 is emitted from the OPM 7. The output laser beam 8 is used for laser machining or other application.

Problems of the conventional AFGLO are described below.

A first problem is described.

FIG. 26 shows a schematic configuration of the laser resonator including an optical bench of conventional AFGLO. The OPM 7 is held by an output mirror holder 150a. The RM 6 is held by a rear mirror holder 150b. On the other hand, the DT 1 is held by a discharge tube holder base (hereinafter called DT base) 170 which is an optical bench, by way of a discharge tube holder (hereinafter called DT holder) 160. Both ends of the DT base 170 are connected to corresponding mirror holders 150a, 150b. The mirror holders 150a, 150b, and DT base 170 are assembled to be in a unitary structure. The DT holder 160 and mirror holders 150a, 150b are connected through a connection tube 180 with both ends held with O-rings or the like so as to be slidable.

In this configuration, the axis linking the center of the RM 6 and the center of the OPM 7, and axes of the RM 6 and OPM 7 are disposed to be perpendicular to each other. That is, the RM 6 and OPM 7 are disposed parallel to each other. The parallelism is adjusted to a precision of several $\mu$m or less to each other. The axis linking the centers of the RM 6 and OPM 7 is disposed to coincide with the central axis of the DT 1.

To obtain a normal laser output, the following conditions are required;

the parallelism of RM 6 and OPM 7 of $10^{-6}$ radian or less, and the precision of the axis formed by the mirror and the axis formed by the DT is tens of $\mu$m or less.

To maintain this precision, the mirror holders and the DT base are formed in a unitary rigid structure.

In the conventional laser oscillator having such configuration, the first problem is explained.

The degree of vacuum in the LGCP is about 100 to 200 Torr. On the other hand, its outside is an atmospheric pressure (760 Torr). Between the inside and outside of the LGCP, a stress due to the pressure difference (hereafter called vacuum force) is applied. Usually, both ends of the DT base 170 are held by a support structure (not shown). The LGCP is also held by a support structure (not shown). Therefore, in the DT holder 160c in the central part shown in FIG. 25, a downward stress is applied due to the pressure difference.

The DT base 170 is made of material of high rigidity such as steel so as not to be bent by the stress due to such pressure difference. To maintain the rigidity, the DT base 170 has a considerably large structure as compared with other parts such as DT 1.

For the purpose of increasing the rigidity, however, the size is limited. Therefore, by the vacuum force, the DT base 170 may be bent by about tens of $\mu$m. As described above, the DT base 170 and mirror holders 150a, 150b are assembled in an unitary structure. Accordingly, if the DT base 170 is bent only by tens of $\mu$m, the parallelism between the mirror holder 150a and mirror holder 150b is changed. By this change in parallelism, the laser output may be lowered.

Besides, since the thermal capacity of the DT base 170 is large, if ambient temperature varies, it cannot follow up the temperature changes. Due to change in ambient temperature, a temperature difference may occur in the parts of the DT base 170 (for example, temperature difference between upper part and lower part, or temperature difference between right side and left side, as shown in FIG. 26). If a temperature difference occurs, the DT base 170 is bent due to a thermal expansion or a thermal shrinke. As a result, the parallelism of RM 6 and OPM 7 cannot be maintained. By this change in parallelism, the laser output may be lowered. FIG. 27 schematically shows the change in the laser output depending on the ambient temperature.

To address this problem, hitherto, the following measures were taken.

As a measure against bending of DT base 170 by vacuum force, for example, it was attempted to use a canceler for canceling the stress due to the pressure difference in order to maintain a balance of stress due to the pressure difference between inside and outside. However, the canceler generated an unexpected stress, and produced adverse effects.

On the other hand, as a measure against the expansion and the shrinkage due to the temperature difference, it was attempted to control the DT base 170 at a constant temperature. This attempt is intended to pass liquid (for example, water) in the DT base 170, and control the liquid temperature to remain constant However, the volume of the DT base 170 is large in order to increase the rigidity. Therefore, the thermal capacity of the DT base 170 becomes larger, and the temperature difference cannot be completely eliminated.

A second problem of the conventional AFGLO is as follows.

The flow of laser gas in the DT 1 is preferred to be uniform in the gas flow direction as far as possible from entry of gas in the DT 1 until its exhaust. When the gas flow is uniform, the discharge state is stable. As a result, the efficiency of laser output versus an electric input to the DA S is enhanced (known as a laser oscillation efficiency). Owing to the specific configuration of the AFGLO, the structure is complicated if the laser gas lead-in portion is provided coaxially with the DT 1. Actually, as shown in FIG. 28, the laser gas lead-in portion is generally disposed nearly at a right angle to the DT 1. FIG. 28 and FIG. 29 schematically show the gas flow in the DT 1. FIG. 29 is a sectional view along line 29—29 in FIG. 28. In this configuration, as shown in FIG. 28, in the DT 1, particularly near the laser gas inlet 137, a vortex 136 is likely to occur in the gas flow. By the vortex , the gas flow in the DT is disturbed. As a result, the laser oscillation efficiency cannot be enhanced. FIG. 30 shows the relation between electric input in the DA 5 and laser output.

As proposed in the prior art (Japanese Patent Laid-Open Publication No. 7-142787), a chamber is provided for storing the gas temporarily, and it is connected to the laser gas lead-in portion. By eliminating the directivity of laser gas entering the laser gas lead-in portion, it is intended to eliminate a non-uniformity of gas flow in the DT. According to the study by the present inventors, the gas flow becomes not uniform when feeding gas is led into the DT from the laser lead-in portion, and vortices were formed in various portions. As a result, the laser oscillation efficiency could not be further enhanced by the configuration proposed in Japanese Patent Laid-open Publication No. 7-142787.

Further, the conventional AFGLO has a third problem.

When the voltage between the electrodes 2, 3 provided around the DT 1 reaches a discharge start voltage, discharge starts. At this discharge start moment, a large rush current flows into the DT 1. When discharge current starts to flow, the impedance of DT drops, and soon at maintenance voltage of about 20 kV settles. In this state, the current is stable and a uniform discharge is obtained. However, due to rush current at the discharge start moment, the discharge is disturbed temporarily. It takes a certain time until the discharge is stabilized. The value of the rush current is proportional to the discharge start voltage. It is hence important to lower the discharge start voltage in order to stabilize discharge.

In the prior art, as shown in FIG. 31, an auxiliary electrode 156 is disposed near the electrode 2 in the DT 1, and the auxiliary electrode 156 and the electrode 3 are connected with a high resistance resistor 158 of several MΩ. In this case, since the distance between the auxiliary electrode 156 and electrode 3 is too long, if laser gas is ionized between the auxiliary electrode 156 and electrode 2, it is almost recombined before reaching the electrode 3. Therefore, in this configuration, a notable effect for decreasing the discharge start voltage cannot be obtained.

FIG. 32 shows another typical example of prior art. Along the outer surface of the DT 1, a conductor 159 is extended from the electrode 2 to the electrode 3 side, and an auxiliary electrode 156 is attached to the end of the conductor 159 closer to the electrode 3 side. The auxiliary electrode 156 is attached to the outer surface of the DT 1 via an insulating sheet 162 made of a dielectric material. To lower the discharge start voltage, it was attempted to reduce the thickness of the dielectric materials, but holes were formed in the wall of the DT 1 due to micro discharge in a course of time.

Thus, in the conventional AFGLO, usually, a mechanism called an auxiliary electrode was added. It was added in an attempt to lower the rush current upon start of discharge by lowering the insulation breakdown voltage in the DT by some mechanism so as to ignite discharge easily. The auxiliary electrode itself was a good idea, but none of the prior art was satisfactory in the aspects of performance and reliability.

Summing up, in the conventional AFGLO,

1) Stress occurs in the parts of the resonator due to a pressure difference between the LGCP and the outside at atmospheric pressure. By this stress, the DT base 170 may be bent by about tens of $\mu$m. Since the DT base 170 and a pair of mirror holders 150 are in unitary structure, if the DT base 170 is bent only by tens of $\mu$m, the mutual angle of the pair of mirror holders 150a and 150b is varied. As a result, it was difficult to enhance the stability of laser output further.

2) In the DT, the laser gas flow tends to be not uniform in the central part or in the peripheral part of the DT. As a result, uniform gas flow is not realized. Hence, the energy efficiency could not be enhanced further.

3) A large rush current flows in the DT at the discharge start moment when the voltage between the electrodes 2, 3 reaches the discharge start voltage. When the rush current flows at the discharge start moment, a large current flows, and the discharge is disturbed temporarily. Accordingly, it takes some time until discharge is stabilized, and discharge is unstable in this period (that is, the laser output is unstable). This transient unstable period of discharge cannot be shortened.

SUMMARY OF THE INVENTION

The present invention is made to improve the above problems.

To address the first problem, the AFGLO of the invention comprises:

a) a DT for exciting a laser medium disposed inside by applying energy;

b) at least a pair of mirrors disposed on an optical axis of a laser beam emitted from the laser medium excited by the DT;

c) at least a pair of mirror holders for holding the mirrors;

d) a plurality of mirror holder connecting rods for connecting the mirror holders;

e) a DT holder for holding the DT; and f) a DT base for holding the DT holder, wherein, g) one mirror holder is fixed to the DT base in the laser beam axial direction and in a perpendicular direction to the laser beam axis, h) the mirror holder has a degree of freedom in the rotating direction within the plane including the laser beam axial direction, and i) the other mirror holder is fixed to the DT base in the perpendicular direction to the laser beam axis, and is slidable in the laser beam axial direction.

To address the second problem, the AFGLO of the invention comprises:

a) a DT for passing laser gas inside and exciting the laser gas;

b) electrodes disposed near both ends of the DT;

c) at least one of the electrodes being disposed near the laser gas inlet of the DT; and d) a laser gas passage for supplying laser gas to the DT, wherein, e) the configuration satisfies the following relation, $$1.1A<B<1.7A$$

where A is the inner diameter of the DT, B is the width in the gas flow direction of the laser gas passage near the laser gas inlet of the DT and in the vertical direction to the gas flow direction in the DT.

To address the third problem, the AFGLO of the invention comprises:

a) a DT;

b) electrodes disposed near both ends of the DT; and c) a high voltage power supply for applying a high voltage between the electrodes, wherein, d) a hole is opened in the DT, e) an auxiliary electrode is disposed in the hole, f) the auxiliary electrode is connected to one of the electrodes via a high resistance resistor, g) the position of the hole opened in the DT is at a distance of 0.4L to 0.7L from the electrode not connected to the auxiliary electrode where L is the distance between the two electrodes, and h) the resistance of the high resistance resistor is in a range of 1 MΩ or more and 100 MΩ or less.

BRIEF DESCRIPTION OF THE DRAWINGS

FIGS. 4A–4C are three-side views showing a coupling area of an OPM holder and DT base of a laser oscillator having another configuration according to example 1.

FIG. 5A is a detailed view of an optical bench of still another laser oscillator configuration of example 1.

FIG. 12 schematically shows laser gas flow in the DT and laser gas passage.

FIG. 13 is a schematic diagram showing laser gas flow in 13—13 plane shown in FIG. 12.

FIG. 14 shows a correlation of height C from the center of the DT, in the columnar protrusion provided at the confronting part of the laser gas inlet of the DT, and laser output.

FIG. 15 shows a correlation of inside diameter D of the columnar protrusion provided at the confronting part of the laser gas inlet of the DT, and laser output.

DETAILED DESCRIPTION OF THE PREFERRED EMBODIMENTS

Embodiment 1

Figure 1:
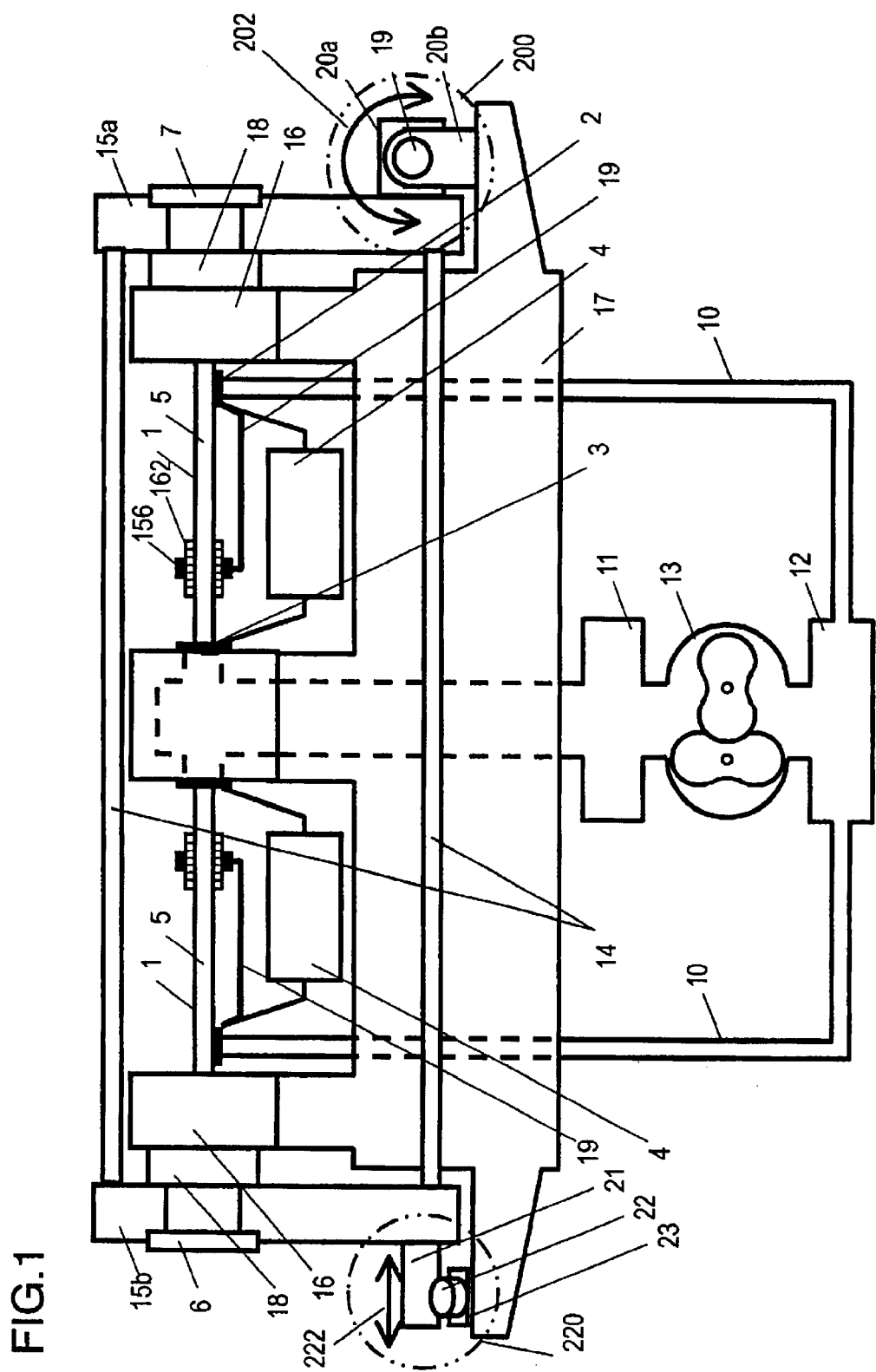
FIG. 1 shows a schematic configuration of an axial flow gas laser oscillator according to example 1 of the present invention.
Figure 2:
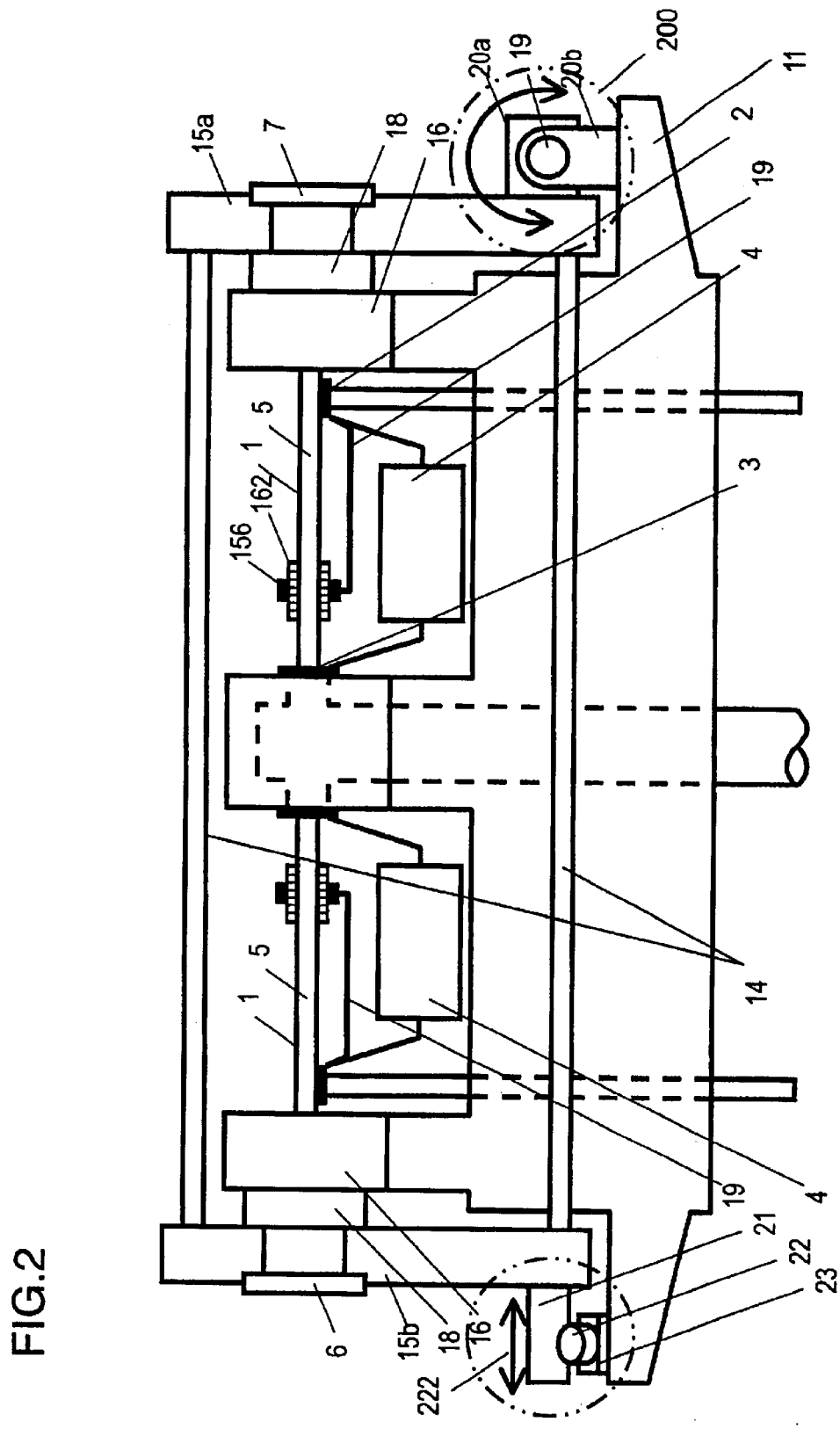
FIG. 2 shows a configuration of resonator section of the laser oscillator shown in FIG. 1.
Figure 3B:
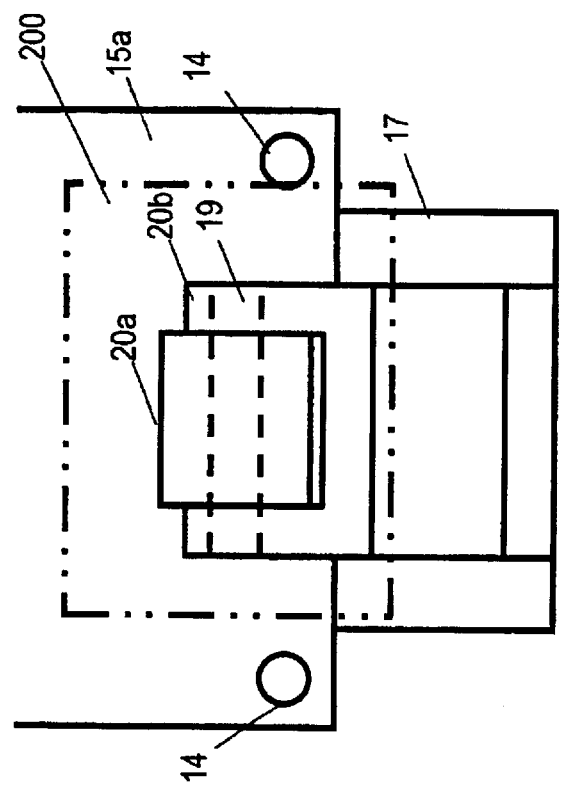
FIG. 3B is a right side view of the resonator section shown in FIG. 2.
Figure 3A:
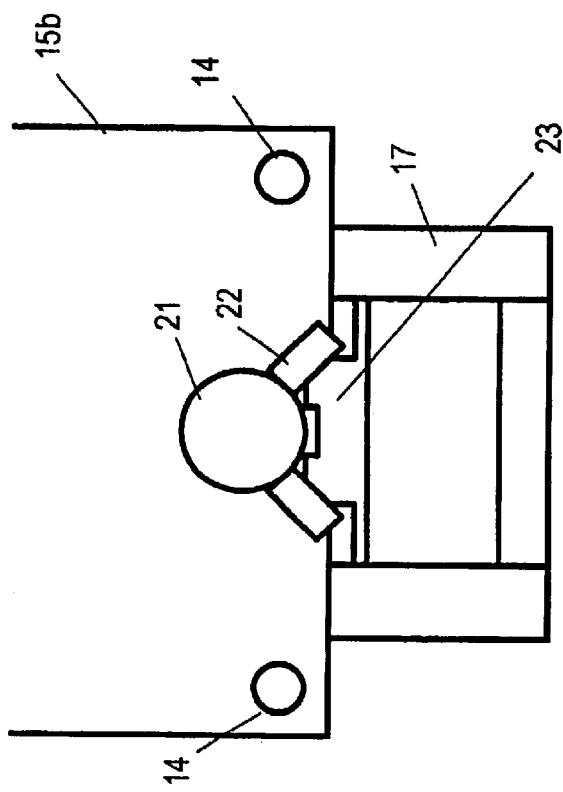
FIG. 3A is a left side view of the resonator section shown in FIG. 2.
Figure 25:
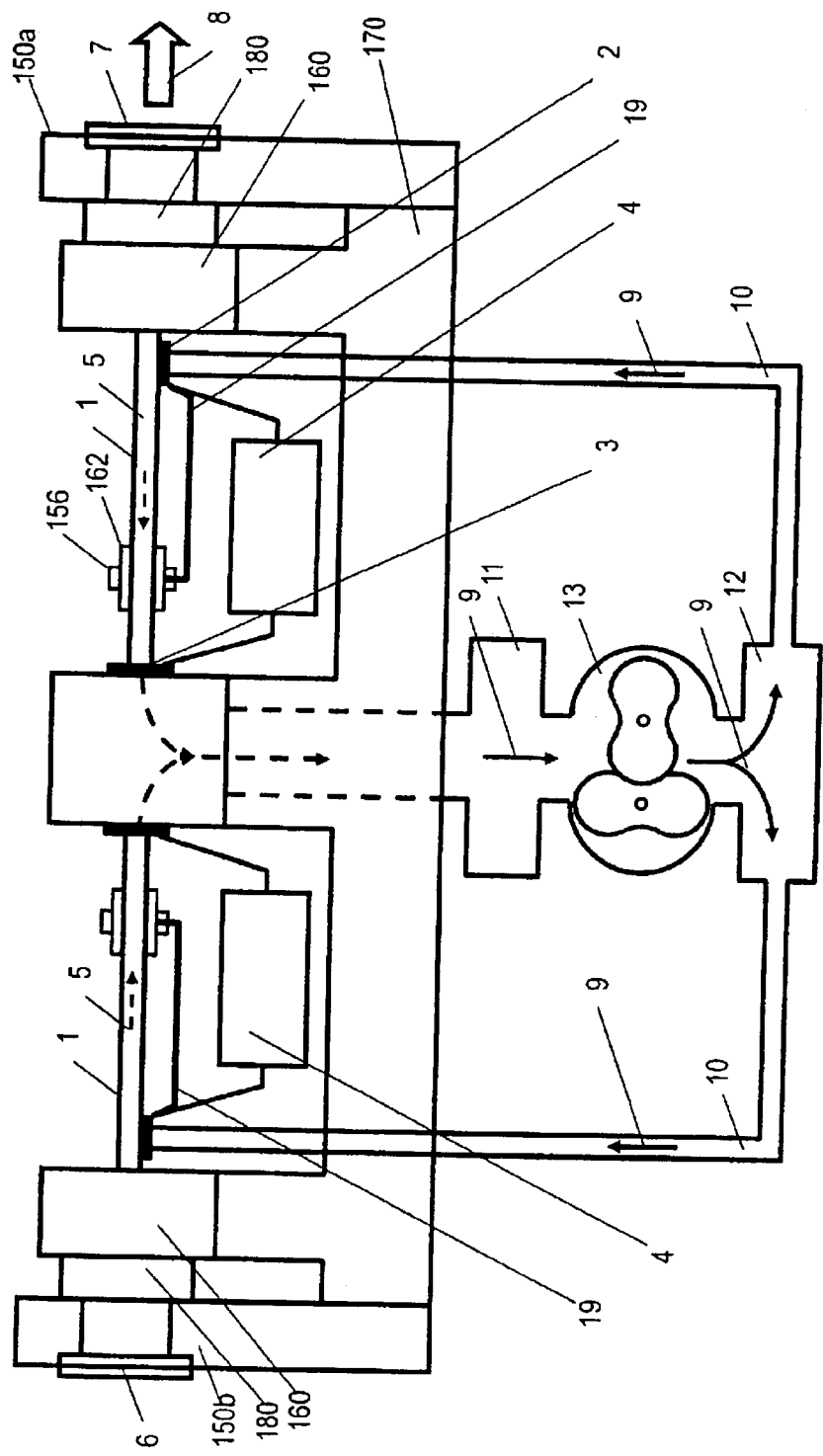
FIG. 25 shows a schematic configuration of conventional axial flow gas laser oscillator.
Figure 26:
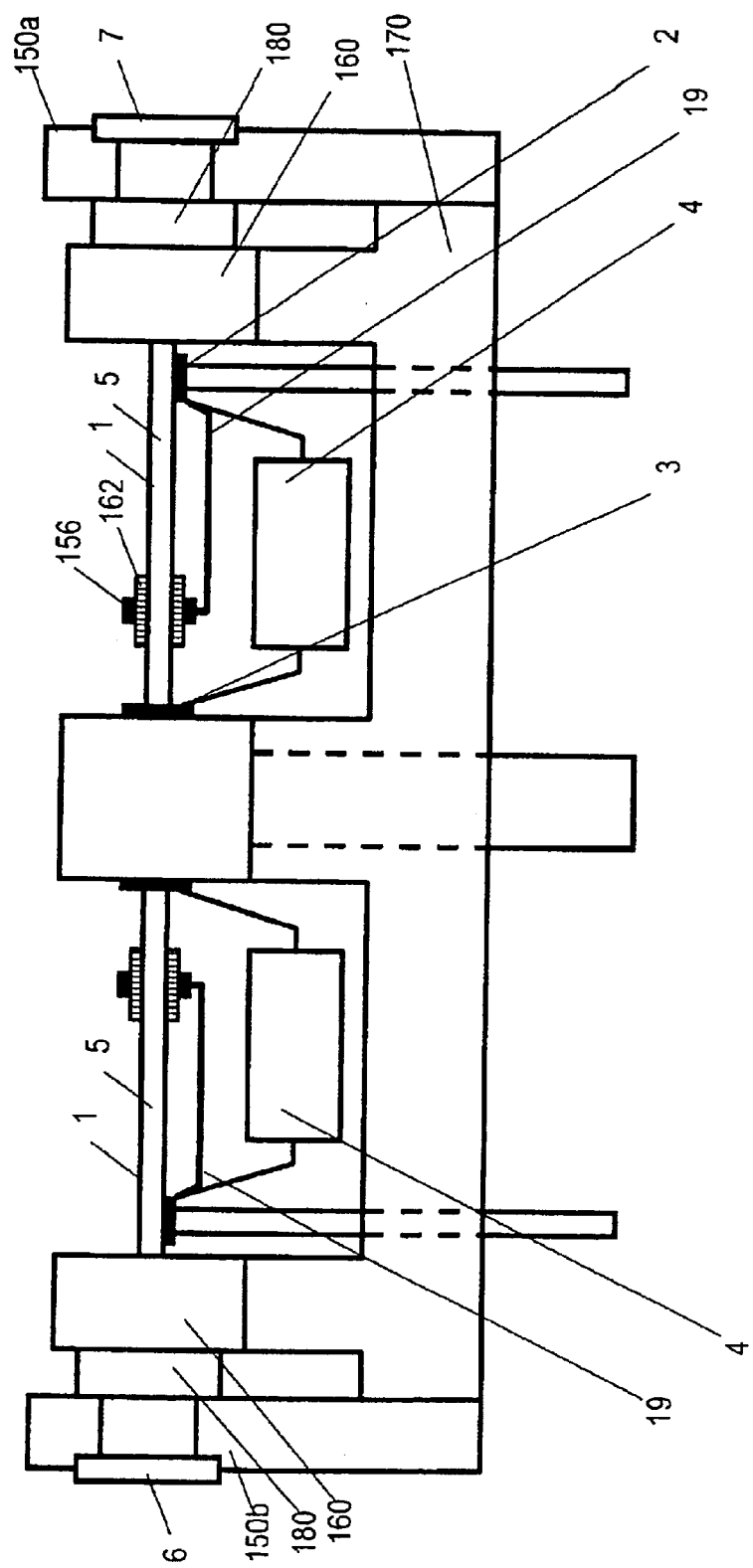
FIG. 26 is a schematic view of optical bench section of the conventional laser oscillator.
Figure 27:
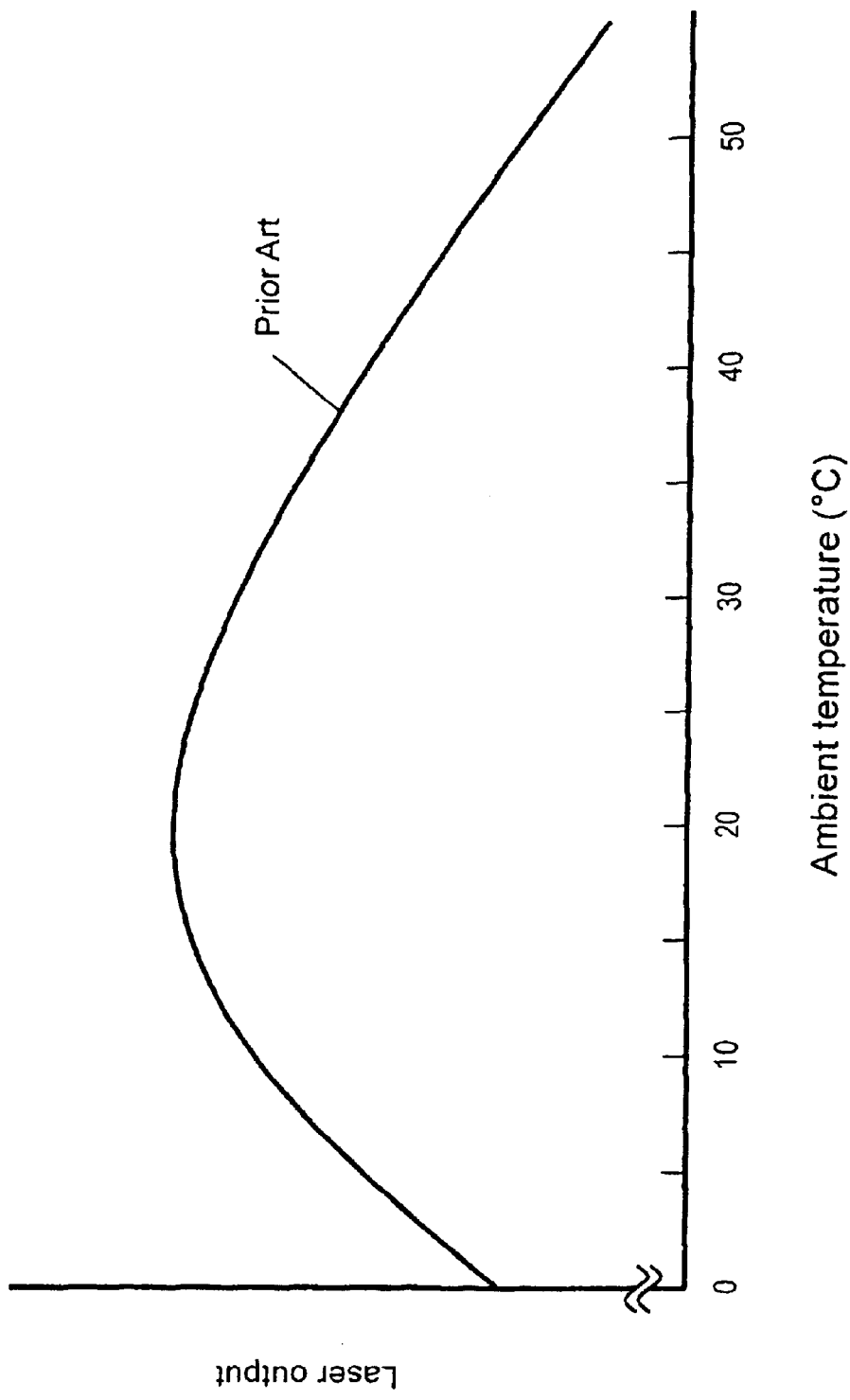
FIG. 27 shows output stability in the conventional laser oscillator.
Figure 30:
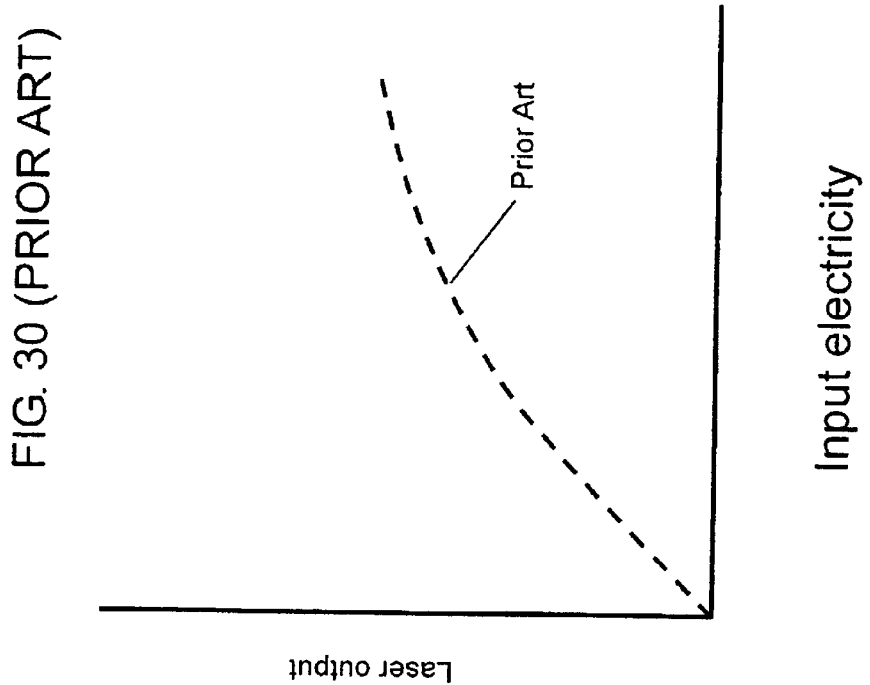
FIG. 30 is a diagram showing the relation between electric input and laser output in prior art.
Figure 28:
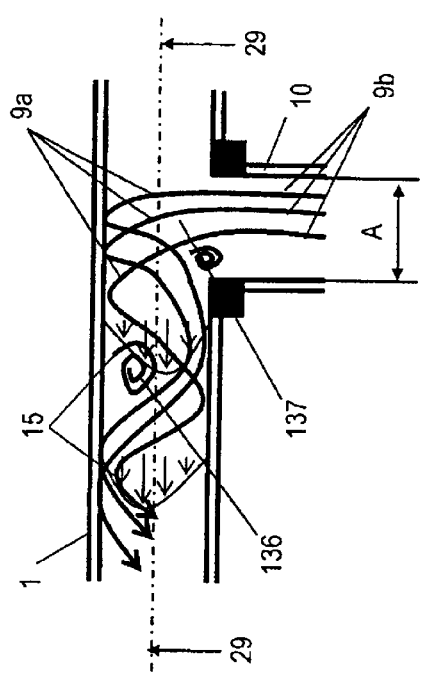
FIG. 28 is a schematic diagram showing detail of DT section in the configuration of the conventional laser oscillator and laser gas flow.
Figure 29:
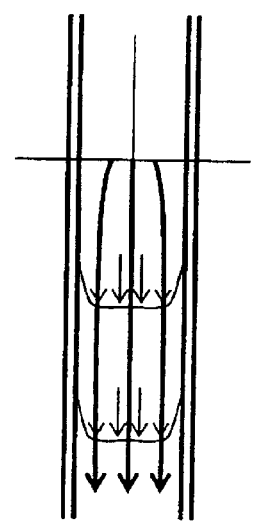
FIG. 29 is a schematic diagram showing laser gas flow in 29—29 plane shown in FIG. 28.

Embodiments of the invention are described below with reference to the accompanying drawings. FIG. 1 shows a laser oscillator according to embodiment 1 of the invention. FIG. 2 shows a configuration of a resonator section of the laser oscillator shown in FIG. 1. FIG. 3A is a left side view of the resonator section shown in FIG. 2. FIG. 3B is a right side view of the resonator section shown in FIG. 2. The same parts as in the conventional laser oscillator shown in FIG. 25 are identified with the same reference numerals, and their description is omitted.

The first embodiment is explained by referring to FIG. 1, FIG. 2, FIG. 3A, and FIG. 3B.

An OPM holder 15a and an RM holder 15b are supported so as to be parallel to each other by a plurality of mirror holder connecting rods (hereinafter called MHCR) 14. A rotation support unit 200 is configured to support the OPM holder 15a on a DT base 17. A support unit 20a for supporting the OPM holder 15a to be perpendicular to the laser beam axis is disposed in the lower part of the OPM holder 15a. A rotary shaft support unit 20b is disposed on the DT base 17. A hole for inserting a rotary shaft 19 is disposed in the support unit 20a and rotary shaft support unit 20b. The rotary shaft 19 is inserted into the support unit 20a and rotary shaft support unit 20b, so that the OPM holder 15a and DT base 17 are assembled together. The contact portions of the rotary shaft 19 and rotary shaft support units 20a, 20b are finished to a smooth surface so as to rotate smoothly with minimum friction. Alternatively, a component extremely small in friction against rotation such as ball bearing (or roller bearing) is inserted. Thus, the rotary shaft 19, support unit 20a, and rotary shaft support unit 29b are combined to compose the rotation support unit 200 for supporting the OPM holder 15a on the DT base 17. The rotation support unit 200 has a degree of freedom in the rotating direction shown by an arrow 202 shown in FIG. 1 and FIG. 2.

On the other hand, a support bar 21 is provided in the lower part of the RM holder 15b. At the DT base 17 side, a rotating element 22 and a rotating element support unit 23 for supporting the rotating element 22 are disposed for supporting the support bar 21. In this manner, a slider structure 220 slidable in the optical axis direction is formed. This slider structure 220 has a degree of freedom in the optical axis direction shown by an arrow 222 in FIG. 1 and FIG. 2.

In this configuration, the OPM holder 15a and DT base 17 are fixed in the perpendicular direction to the laser beam axial direction. However, the OPM holder 15a and DT base 17 have a degree of freedom only in the rotating direction within the plane including the laser beam axial direction. As a result, the OPM side mirror holder 15a and DT base 17 can be coupled without deviation of optical axis.

On the other hand, the rear mirror holder 15b and DT base 17 are fixed in the perpendicular direction to the laser beam axial direction (however, they are free in the upward direction, strictly). That is, by a weight (own weight) of the mirror holder 15b, the rear mirror holder 15b and DT base 17 are supposed to be fixed. Of course, this configuration is free in the sliding direction of optical axis direction and in the rotating direction within the plane including the optical axis direction. As a result, the RM side mirror holder and DT support unit are also coupled without deviation of optical axis same as at the OPM side.

The following explanation is made when the DT base 17 is deformed by the vacuum force or the temperature change. When the DT base 17 is bent by vacuum force, rotation within the plane including the optical axis direction occurs in the coupling portion of the mirror holder and DT support unit. As described above, this portion is free in the rotating direction both at the OPM side and RM side. Accordingly, the mirror holder is free from any force causing change in the parallelism due to vacuum force or thermal stress. In the event of thermal expansion or thermal shrinkage of DT support unit, linear displacement in the optical axis direction occurs at the coupling portion with the mirror holder, but since the RM holder is held free in this direction, force to cause change in parallelism is not applied to the mirror holder by the vacuum force or the thermal stress.

An excellent feature of the configuration of the present invention lies in the coupling portion of the OPM holder and DT support unit. This system also has a degree of freedom structurally other than the rotating direction within the plane including the optical axis direction. For example, it may be configured to have a coupling member high in a degree of freedom such as pillow balls at two positions each in the lower part of the OPM holder 15a and RM holder 15b. In this system, however, the degree of freedom is limited by fixing at two points. Accordingly, it is likely to cause change in the parallelism due to vacuum force. Besides, the distance between two fixing points varies due to thermal expansion or thermal shrinkage of the mirror holder itself, and hence a force to cause change in parallelism is likely to occur.

FIGS. 4A–4C show detailed views of a junction of the OPM holder and DT support unit of a laser oscillator of another configuration of the present embodiment. The rotary shaft 19, support unit 20a, and rotary shaft support unit 20b are combined without a clearance (without a gap). However, if completely free from a gap, rotation is not smooth due to friction. As mentioned above, by inserting a ball bearing in the contact portions of the rotary shaft 19, support unit 20a, and rotary shaft support unit 20b, it is substantially free from clearance to the parallel direction to the optical axis direction. Besides, as being pushed down by the own weight of the mirror holder, the central axis of the discharge tube and optical axes of the mirrors, and a relative position between the mirrors are hardly changed and are stable. However, concerning the direction vertical to the optical axis, a gap is needed for smooth rotation between the support unit 20a and rotary shaft support unit 20b. To prevent looseness due to this gap, an elastic force is employed to push the upper rotary shaft support unit 20a to the lower rotary shaft support unit 20b at one side. FIG. 4 shows an example of such structure. For example, two spring members 24 are symmetrically disposed on both sides of the rotary shaft, and the elastic force of the spring members 24 is applied to the support unit 20a. Between a spring holder 25 provided on the rotary shaft 19 and the upper rotary shaft member 20a, the spring members 24 are placed shrinked. Besides, in order that the spring holder 25 and spring members 24 may not impede the motion in the rotating direction, a rotating element such as pillow ball 26 is inserted in the junction between the rotary shaft 19 and spring holder 25.

However, as for linkage of RM holder 15b and DT base 17, it is not limited to one-point fixing as described above in the present embodiment. The RM holder and DT support unit may be fixed at two points by using pillow balls or other coupling members having a high degree of freedom. At this time, there is no problem if the OPM side is fixed at one point as shown in the embodiment of the present invention.

Figure 5B:
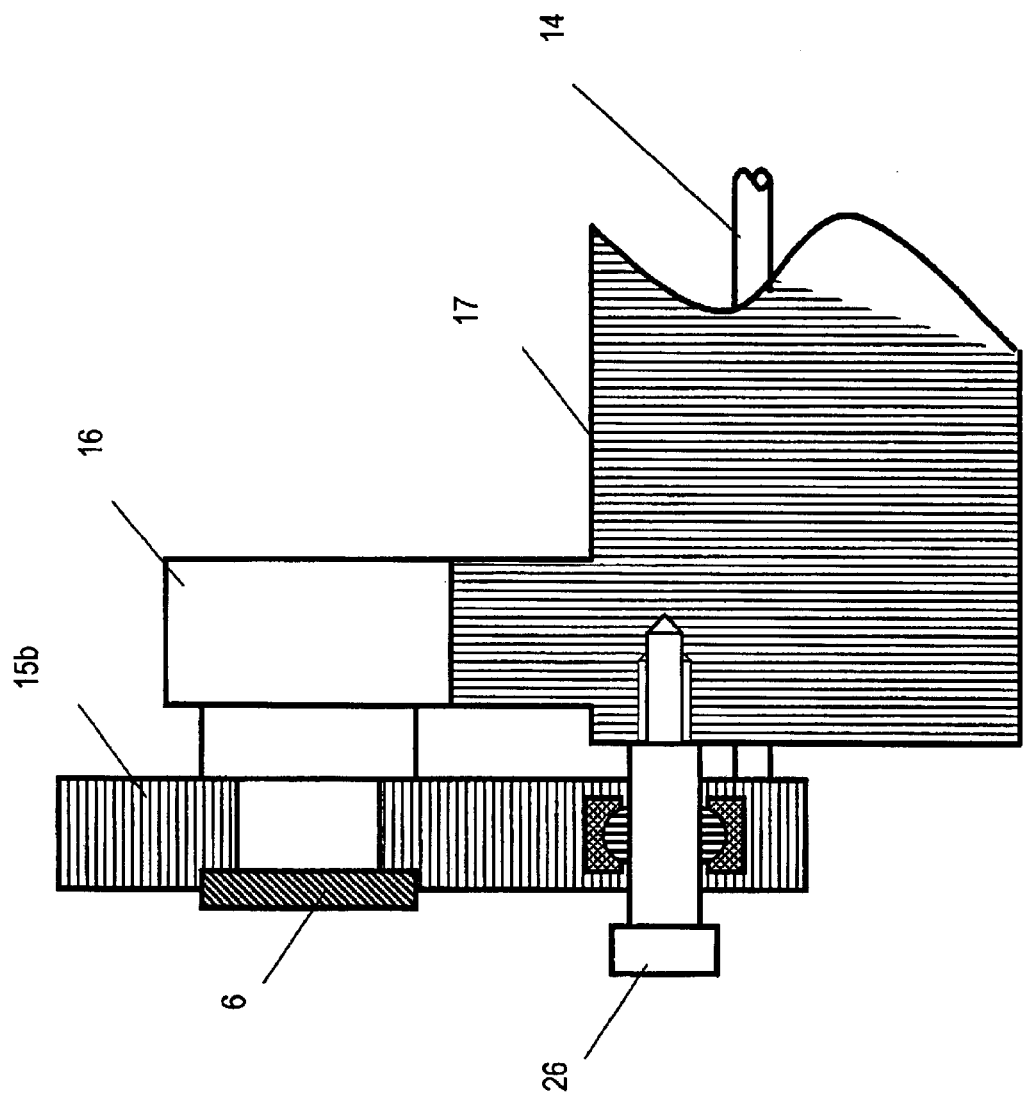
FIG. 5B is an enlarged sectional view of a stand near pillow ball structure shown in FIG. 5A.

FIGS. 5A and 5B are detailed views of an optical bench of laser oscillator showing still another configuration of the present embodiment.

Figure 6:
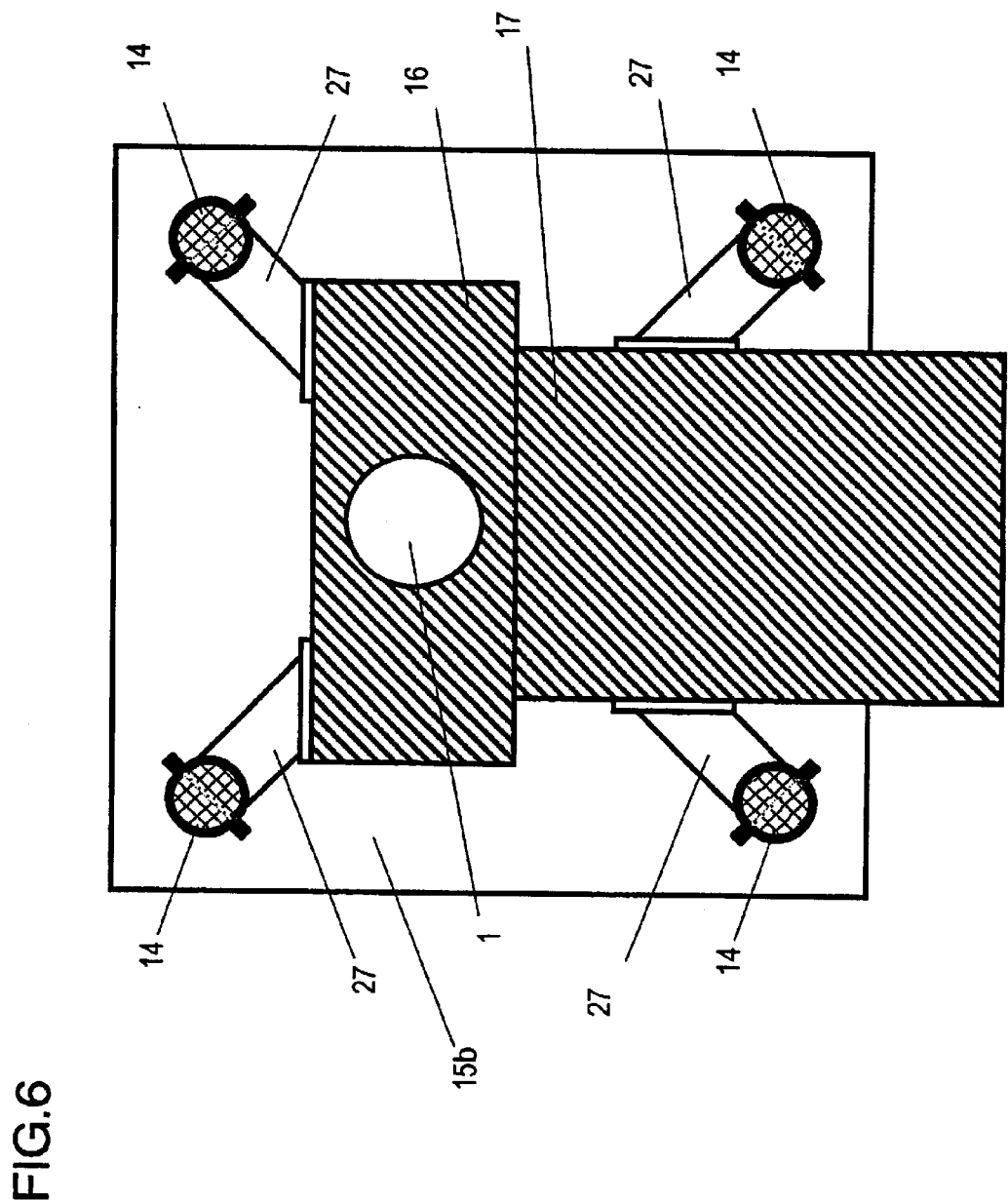
FIG. 6 is a view of RM 6 seen from 6—6 plane shown in FIG. 5A.

Same as in the embodiment shown in FIG. 2, the mirror holders 15a and 15b are mutually coupled by means of a plurality of MHCRs 14. Similarly, the OPM holder 15a is supported on the DT base 17 by means of the rotation support unit 200. On the other hand, in the lower part of the RM holder 15b, pillow balls 26 are disposed at two points in the horizontal direction. The rear mirror holder 15b is coupled to the DT base 17 through the pillow balls 26. FIG. 6 is a view of RM 6 seen in a direction from 6—6 shown in FIG. 5A. As shown in FIG. 6, for connecting the DT holder 16, DT base 17, and MHCRs 14, ribs 27 are disposed at four positions. The ribs 27 are disposed near the center of MHCRs 14. The ribs 27 and MHCRs 14 are designed to slide slightly in the vertical direction.

The optical bench stabilizing effect achieved by inserting the ribs 27 is now explained. When the DT base 17 is deformed by vacuum force or temperature change, in particular, when expanded or shrunk by temperature change, the following effects occur. At this time, in the coupling portion of the mirror holder and DT base 17, a linear displacement occurs in the optical axis direction. However, the pillow balls are free to move because sliding occurs between the pillow balls and the shaft passing through the pillow balls. Accordingly, the RM holder is free in this direction. Therefore, any force causing change in parallelism does not occur on the mirror holder due to thermal stress. However, even if a friction is reduced so as to be freely movable structurally, actually, the friction is not zero. The junction of the rear mirror holder 15b and DT base 17 is pushed in the direction of gravity (that is, in the downward direction in FIG. 5A) due to the own weight of the rear mirror holder 15b. Therefore, a frictional force occurs in this portion, strictly speaking. On the MHCR 14, too, a tensile or compressive force works in the optical axis direction. The MHCR 14 is a circular column of about 50 mm in diameter, and 1000 to 2000 mm in length. When tensile or compressive force works in the optical axis direction (that is, in the longitudinal direction of MHCR 14), the MHCR 14 deflects. At this time, if ribs 27 are not disposed; each MHCR 14 is bent in an arbitrary direction. As a result, the parallelism of the OPM holder 15a and RM holder 15b is broken.

When four MHCRs 14 and ribs 27 for coupling the DT holder 16 and DT base 17 are disposed, the rigidity of the MHCRs 14 is enhanced, and they are not bent by frictional force. Therefore, the parallelism of the mutual mirror holders is maintained.

Further, when all MHCRs 14 are made to deflect in the central direction or in the peripheral direction, the parallelism of the OPM holder 15a and RM holder 15b is maintained more accurately.

For example, four MHCRs 14 are mutually attracted in the central direction by several millimeters by the ribs 27. The mirror holder connecting members are attracted in the central direction by about several millimeters by the ribs 27, and are slightly warped. In this state, when a tensile or compressive force is applied to the MHCRs 14, all of four MHCRs 14 are deflected in the central direction. As a result, the parallelism of the OPM holder 15a and RM holder 15b is maintained.

On the contrary, the same effects are obtained by warping the four MHCRs 14 in mutually opposite directions by the ribs 27.

Thus, in the embodiment of the present invention, the optical bench becomes very stable, and the effect of keeping parallelism between mirrors is extremely large. As a result, stable laser oscillation is always possible, and the laser output is substantially stabilized.

Figure 7:
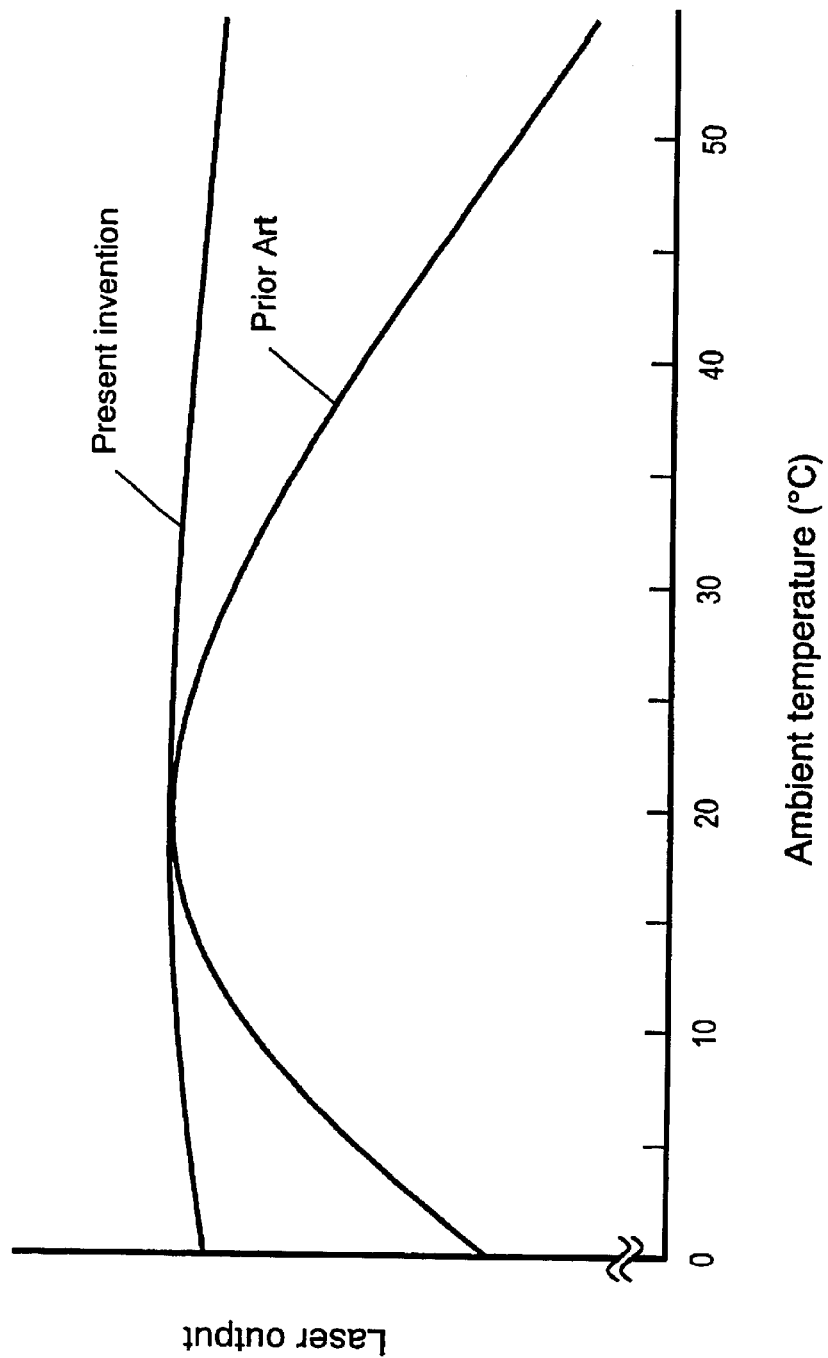
FIG. 7 shows a difference in laser output due to a change in ambient temperature between an example of the present invention and a prior art.

FIG. 7 shows a difference in laser output due to change in ambient temperature between the embodiment of the present invention and the prior art. The axis of abscissa denotes the ambient temperature, and the axis of ordinate represents the laser output. Both in the present embodiment of the invention and in the prior art, it is adjusted so that the mirrors may be parallel to each other at an ambient temperature of 20° C. The diagram shows changes of laser output when the ambient temperature is lowered or raised from this state. As shown in FIG. 7, in the embodiment of the present invention, as compared with the prior art, the laser output is stabilized substantially in spite of the change in ambient temperature. Similar effects are obtained regarding the vacuum force or the external force.

The present invention therefore provides a laser oscillator having a stable optical bench, or a stable mirror parallelism regardless of vacuum force, external force or ambient temperature change, and is capable of obtaining stable laser output all the time.

The connecting rods of the mirror holder connecting rods may be composed of pipes. The connecting rods or pipes are preferably made of materials small in coefficient of thermal expansion, so that a small difference in expansion due to temperature difference is effective for the resonator of the present invention.

Embodiment 2

Embodiment 2 of the present invention is explained with reference to the drawings.

Figure 8:
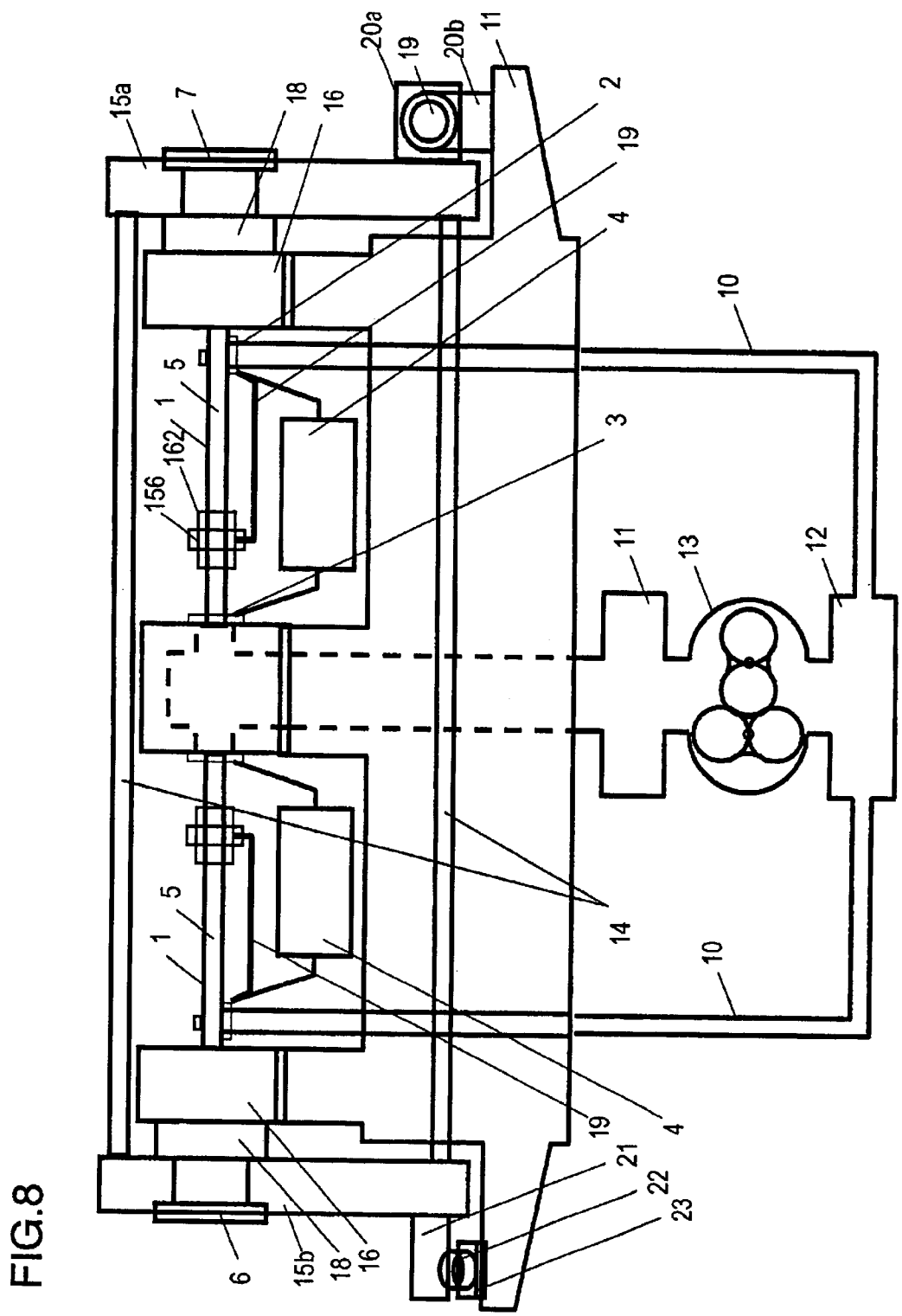
FIG. 8 shows a configuration of a laser oscillator according to example 2 of the present invention.
Figure 9:
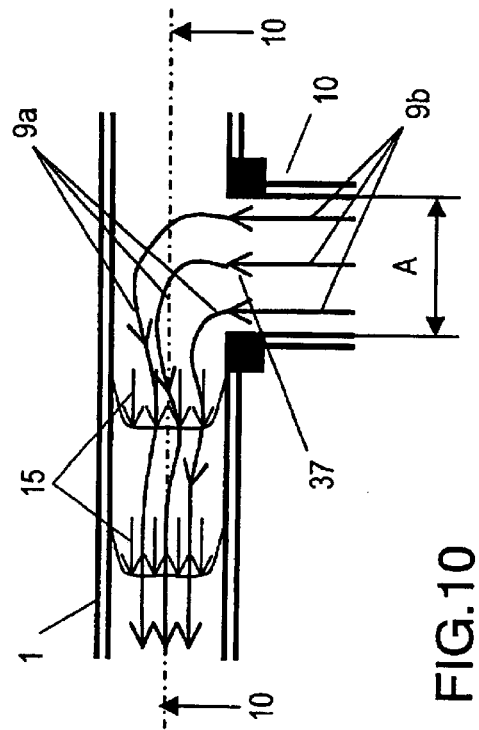
FIG. 9 is a schematic diagram showing laser gas flow in the DT and laser gas passage of the laser oscillator in the example of the present invention.
Figure 10:
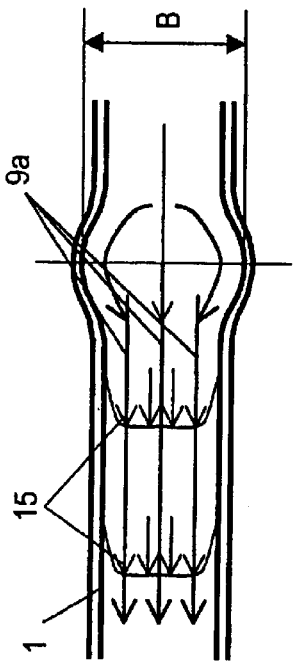
FIG. 10 schematically shows laser gas flow in 10—10 plane shown in FIG. 9.

FIG. 8 shows a configuration of a laser oscillator according to the second embodiment of the present invention. FIG. 9 is a schematic diagram showing laser gas flow in the DT and laser gas passage of laser oscillator in the embodiment of the present invention. FIG. 10 is a schematic diagram showing laser gas flow in. 10—10 plane in FIG. 9. A width in the gas flow direction near the laser gas inlet 37 of the DT 1, and a width in the perpendicular direction to the gas flow direction in the DT is defined as B. The inside diameter of the DT is defined as A. FIG. 9 shows the laser gas flow in the DT and laser gas passage when a relation between A and B is configured as $$1.1A < B < 1.7A.$$

Figure 11:
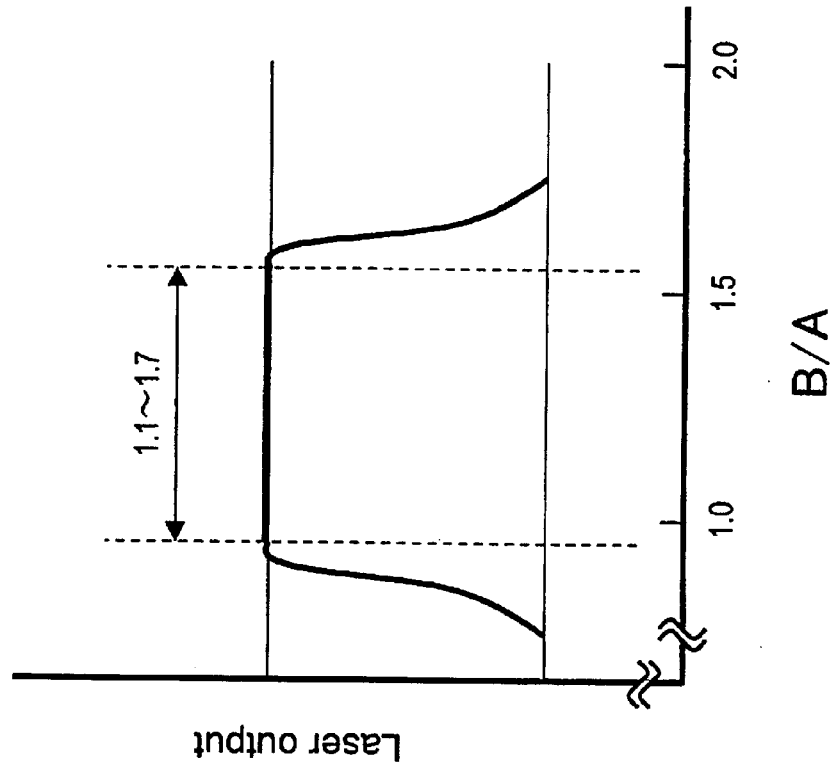
FIG. 11 shows a correlation of width B near laser gas inlet of DT and laser output.

In FIG. 9, the laser gas flowing through the laser gas passage of width B in a direction of arrows 9b is guided into portion of the width B near the inlet of the DT. From this portion, laser gas flow is narrowed to the inside diameter A of the DT. Afterwards, the laser gas flows in a direction of arrows 9a in the DT. At this time, the laser gas flows to the downstream side of the DT 1 with a moderate slope from the wide portion (that is, width B) near the inlet of DT 1. Accordingly, the gas flow forms a mild streamline from the inlet 37 of the DT 1 to the downstream side (thereby not forming vortex). Distribution of laser gas flow in the DT 1 is formed almost uniformly on the whole. At this time, if the width B is smaller than 1.1 A (that is, in the prior art configuration), a vortex is formed in the DT inlet. 1f the width B is larger than 1.7 A, a vortex is also formed in the DT inlet. By this vortex, the laser gas flow in the DT is disturbed. FIG. 11 shows that a correlation between the width B near laser gas inlet of DT and laser output. FIG. 11 shows when the width B near the laser gas inlet is in a range of $$1.1A < B < 1.7A,$$

the laser output is maximum. As the discharge is stabilized in this range, the laser output becomes maximum.

FIG. 12 shows a shape of another DT. In the confronting part of the laser gas inlet of the DT, a circular columnar protrusion of height of C from the center of the DT and inside diameter of D is provided. When an inner diameter of the DT is to be A, C and D are configured to satisfy the following relations.

$$0.5A < C < 0.9A$$

$$0.7A < D < 0.9A$$

FIG. 12 schematically shows laser gas flow in the DT and laser gas passage. FIG. 13 is a schematic diagram showing laser gas flow in 13—13 plane in FIG. 12. The laser gas flowing the laser gas passage in a direction of arrows 9b is led in from the laser gas inlet of the DT. It further collides to the circular columnar protrusion provided in the confronting part of the laser gas inlet of the DT. The laser gas further flows downstream. Therefore, a mild streamline is formed from the DT inlet to the downstream side. As a result, the laser gas flow distribution in the DT is formed uniformly on the whole.

On the other hand, if the circular columnar protrusion is too large, a vortex is formed in the upper part of the DT, and the streamline in the DT is disturbed. If the vortex is formed in various parts of the DT, the laser gas flow distribution in the DT becomes extremely non-uniform. As a result, discharge is disturbed, and stable laser oscillation is not maintained. FIG. 14 shows a correlation between height C from the center of DT in the circular columnar protrusion provided at the confronting part of the laser gas inlet of DT, and laser output.

As shown in FIG. 14, the laser output is maximum when the height C is in a range of $$0.5A < C < 0.9A.$$

As the discharge is stabilized in this range, the laser output becomes maximum.

FIG. 15 shows a correlation between inner diameter D of the columnar protrusion provided at the confronting part of the laser gas inlet of DT, and laser output.

As shown in FIG. 15, the laser output is maximum when the inner diameter D is in a range of $$0.7A < D < 0.9A.$$

As the discharge is stabilized in this range, the laser output becomes maximum.

Electrodes are provided near the laser gas inlet of the DT. If the columnar protrusion near the confronting part is made of metal or conductor, the electric field is disturbed, and discharge is likely to be disturbed. Therefore, the confronting part must be made of dielectric material same as the DT. Specifically, same as the DT, it is preferably made of Pyrex, quartz, ceramic, or other dielectric materials.

Figure 16:
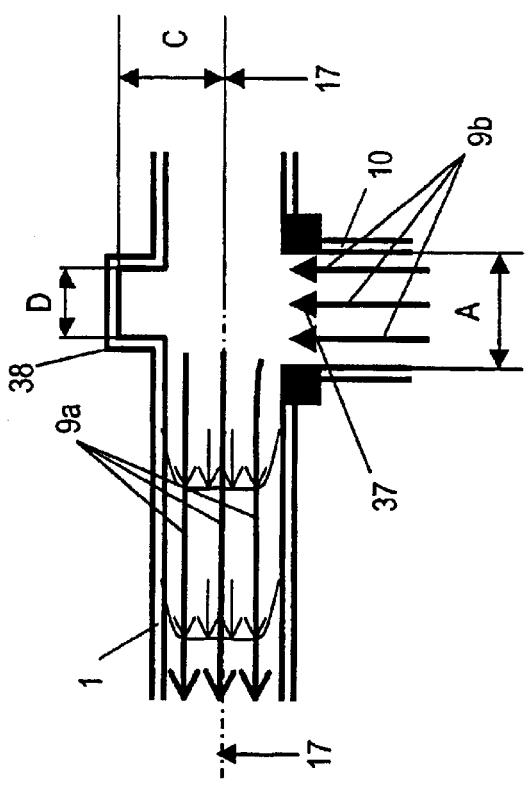
FIG. 16 is a schematic diagram showing laser gas flow near the DT and in the DT.
Figure 17:
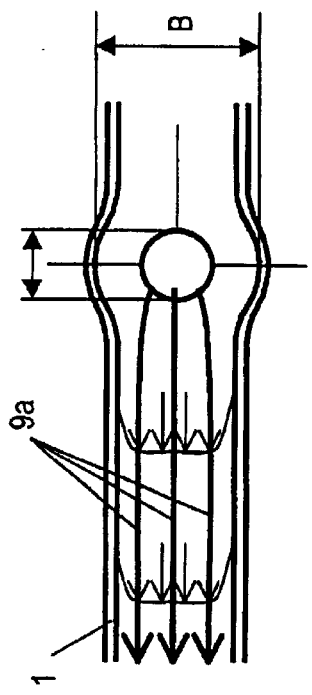
FIG. 17 schematically shows laser gas flow in 16—16 plane shown in FIG. 16.

FIG. 16 is a schematic diagram showing laser gas flow near the DT and in the DT. FIG. 17 is a schematic diagram showing laser gas flow in 16—16 plane in FIG. 16.

The width in the perpendicular direction to the gas flow direction near the laser gas inlet 37 of the DT is defined as B. In the laser gas inlet confronting part of the DT, a circular columnar protrusion 38 of height of C from the center of the DT and inner diameter of D is provided.

When the inner diameter of the DT 1 is defined as A, it is configured to establish the relations of $$1.1A < B < 1.7A$$

$$0.5A < C < 0.9A$$

$$0.7A < D < 0.9A$$

The columnar protrusion 38 provided in the laser gas inlet confronting part of the DT is made of ceramic or other dielectric material.

The laser gas flowing direction in the DT is supposed to be 9a, and the laser gas flowing direction in the laser gas passage is 9b.

Figure 18:
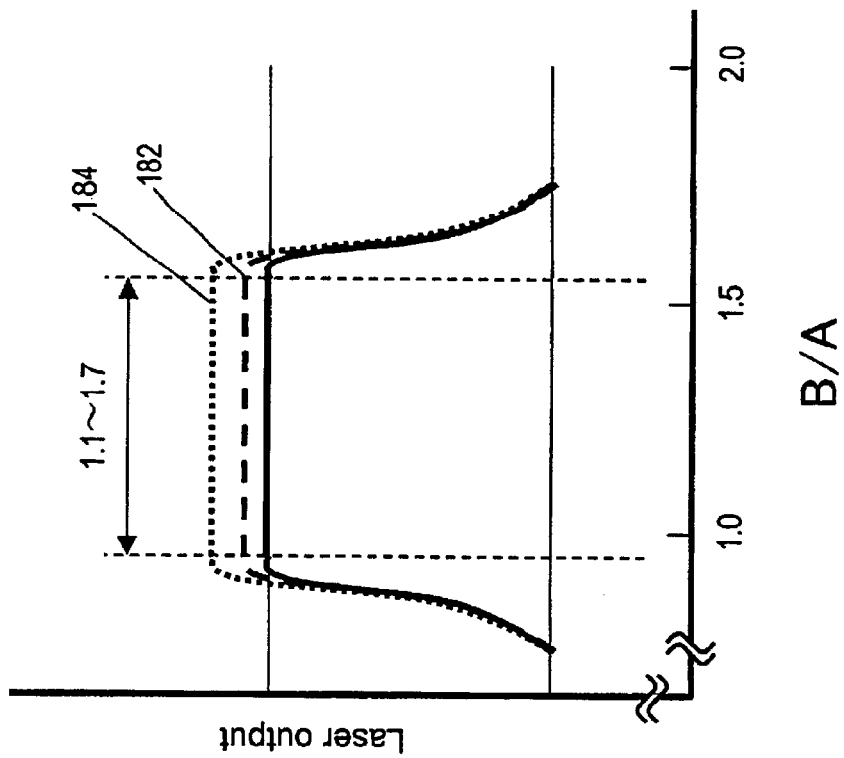
FIG. 18 is an overlapped diagram of correlation of width B and laser output shown in FIG. 11 with the laser output in the configuration in FIG. 16.

FIG. 16 shows a combined configuration of the configurations shown in FIG. 9 and in FIG. 12. In this configuration, discharge is further stabilized owing to synergistic effects of FIG. 9 and FIG. 12, and the configuration is very effective. FIG. 18 is an overlapped diagram of correlation between width B and laser output in the configurations shown in FIG. 11 and in FIG. 16.

Figure 19:
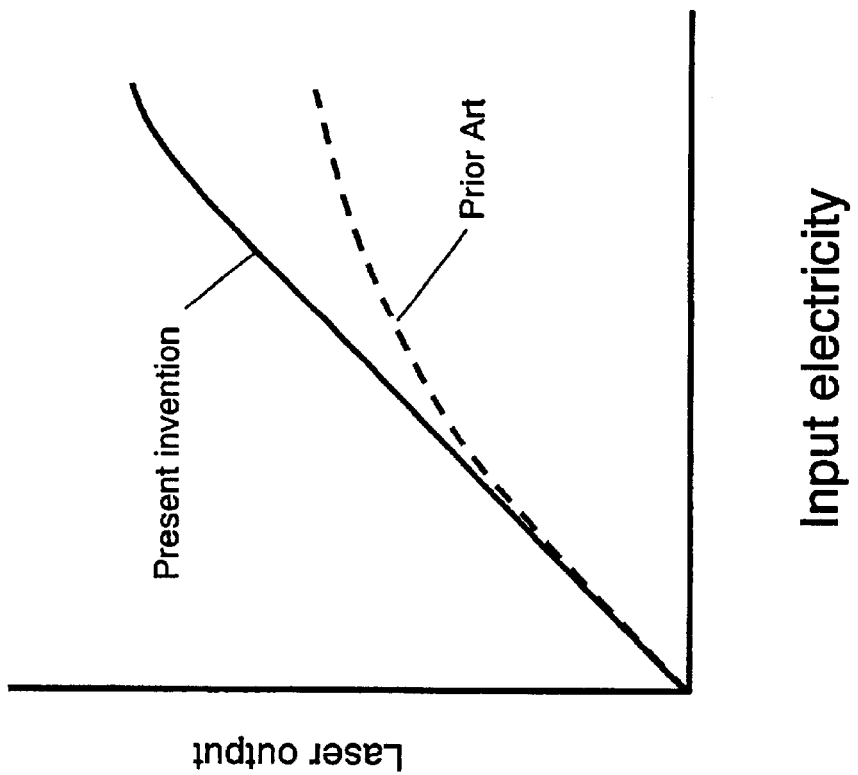
FIG. 19 shows a difference of laser output from electric input to DT, between the example of the present invention and a prior art.

FIG. 19 shows a difference of laser output vs electric input to the DT, between the embodiment of the present invention and the prior art. The discharge electric input is shown on the axis of abscissas, and the laser output is given on the left side of the axis of ordinate. As shown in FIG. 19, in the embodiment of the present invention, the laser output is increased substantially as compared with the prior art owing to the laser gas flow improving effect.

By forming a uniform laser gas flow in the DT, the present invention provides a laser oscillator with a substantially enhanced laser oscillation efficiency and an increased laser output.

Embodiment 3

Figure 20:
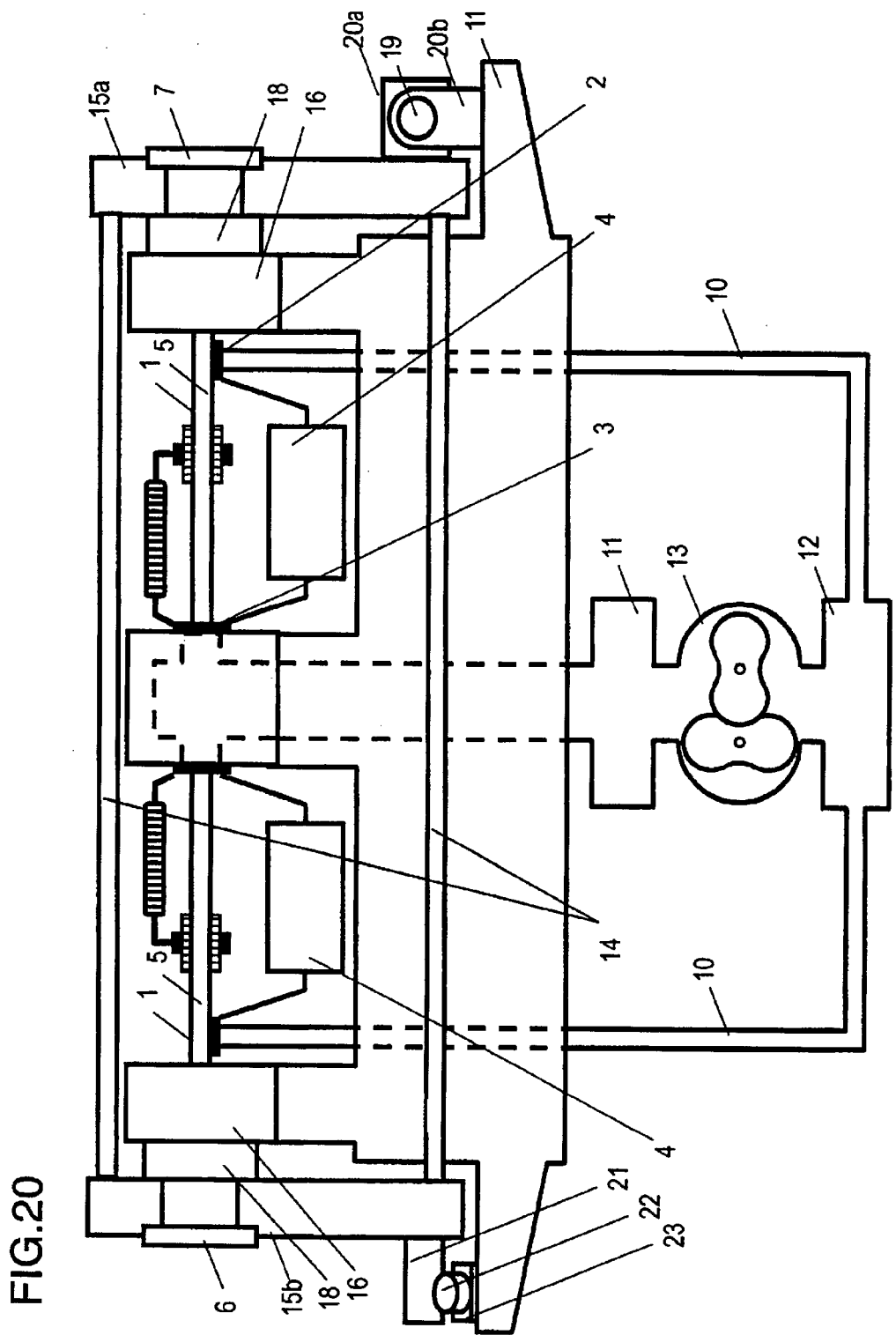
FIG. 20 shows a laser oscillator according to example 3 of the present invention.
Figure 21:
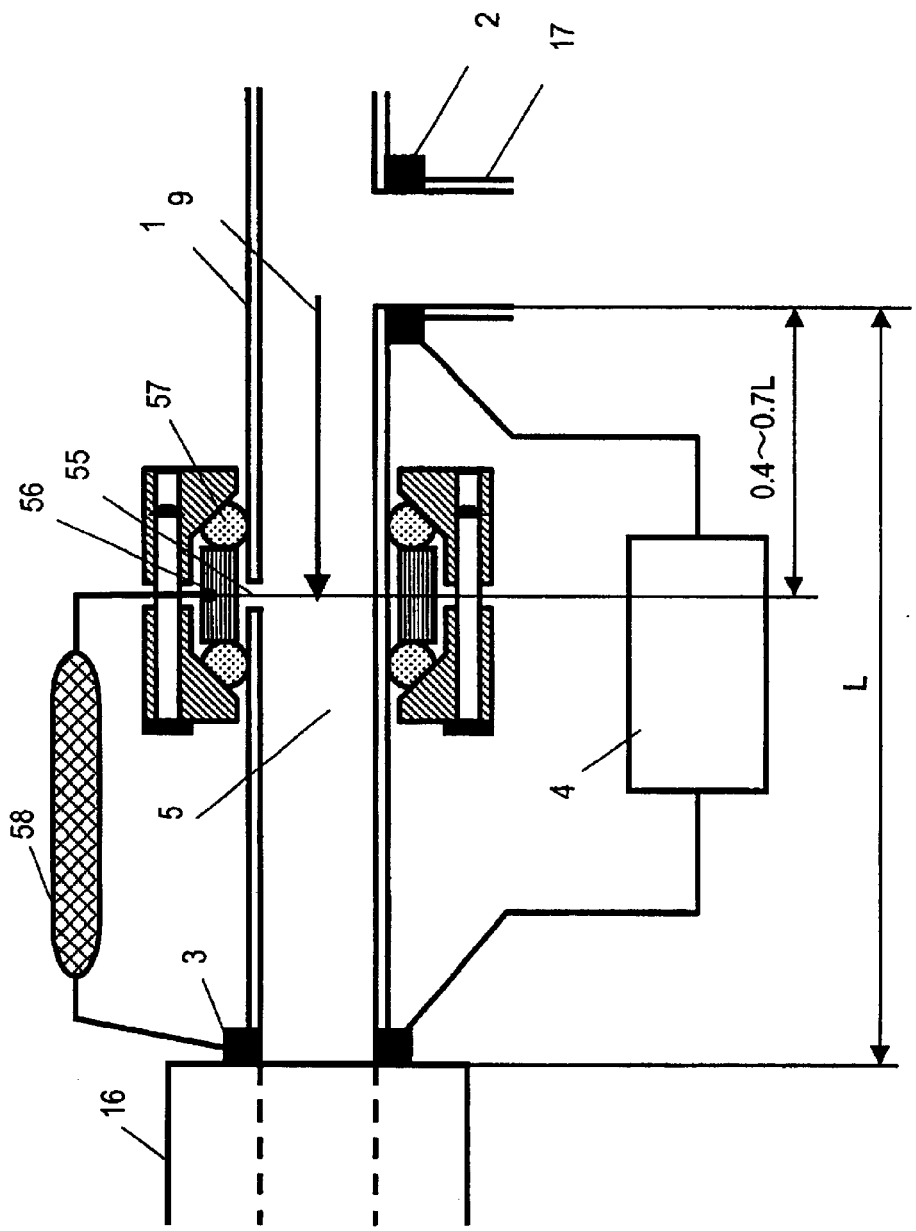
FIG. 21 schematically shows a detailed configuration of a DT section in the laser oscillator shown in FIG. 20.

Embodiment 3 of the present invention is explained with reference to the drawings. FIG. 20 shows a laser oscillator according to the third embodiment of the present invention. FIG. 21 is a schematic diagram showing a detailed configuration of a DT section in the laser oscillator shown in FIG. 20.

A hole 55 is opened in the wall of a DT 1 evacuated to about 100 to 200 Torr. To cap this hole, an auxiliary electrode 56 made of copper, tungsten or the like conductor is provided. The junction area of the auxiliary electrode 56 and DT 1 is sealed with an O-ring or other vacuum seal 57. The auxiliary electrode 56 is configured to contact directly with the laser gas in the DT 1. The auxiliary electrode 56 is connected to the electrode 3 via a high resistance resistor 58 of several MΩ. Electrode 2 and electrode 3 are connected to the power supply 4.

The operation of this configuration is explained. The auxiliary electrode 56 is connected to the electrode 3 by way of the high resistance resistor 58. Accordingly, while current is not flowing in the DT 1, the electrode 3 and auxiliary electrode 56 are at a same potential.

When the voltage between the electrode 2 and electrode 3 is gradually increased by the high voltage power supply 4, the voltage between the electrode 2 and auxiliary electrode 56 is also increased at the same time. In the absence of the auxiliary electrode 56, the discharge start voltage between the electrode 2 and electrode 3 reaches to about 40 kV. However, since the auxiliary electrode 56 is located near the electrode 2, the discharge start voltage of the electrode 2 and auxiliary electrode 56 is about 23 to 24 kV. That is, when the potential difference between the electrode 2 and electrode 3 reaches about 23 to 24 kV, discharge starts between the electrode 2 and auxiliary electrode 56 with a same potential difference. The laser gas in this discharge passage (discharge space 5) is ionized. The ionized laser gas flows to the electrode 3 as indicated by a flow direction 9 of laser gas. By this ionized laser gas, the impedance in the DT 1 decreases, and discharge starts in the DA 5 between the electrode 2 and electrode 3. On the other hand, the discharge current between the electrode 2 and auxiliary electrode 56 is suppressed by the high resistance resistor 58 of several MΩ provided between the auxiliary electrode 56 and electrode 3. As a result, after start of discharge, current hardly flows between the auxiliary electrode 56 and electrode 3.

By this operation, the discharge start voltage can be decreased from the conventional level of 40 kV to 23 to 24 kV.

Thus, the rush current at the discharge start moment can be suppressed, and a stable discharge is obtained.

Figure 31:
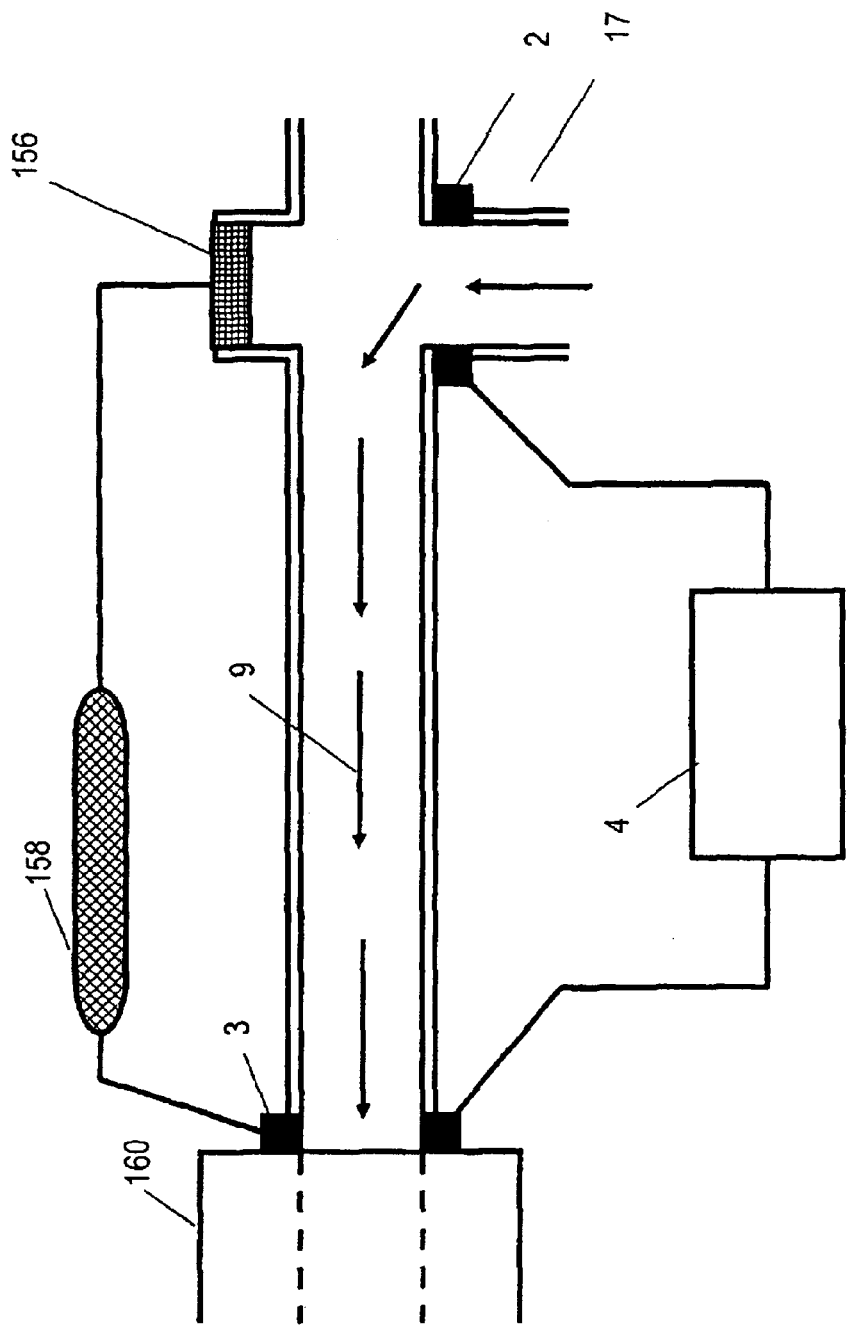
FIG. 31 is a schematic diagram showing configuration of DT section in prior art.

As described above, in the prior art shown in FIG. 31, the auxiliary electrode 156 was disposed near the electrode 2 in the DT 1, and the auxiliary electrode 156 and the electrode 3 were connected through a high resistance resistor of several MΩ. In this case, since the distance between the auxiliary electrode and the negative electrode is too long, ionized gas is mostly recombined before reaching the negative electrode, even if the laser gas is ionized before, and notable effect was not obtained.

Figure 22:
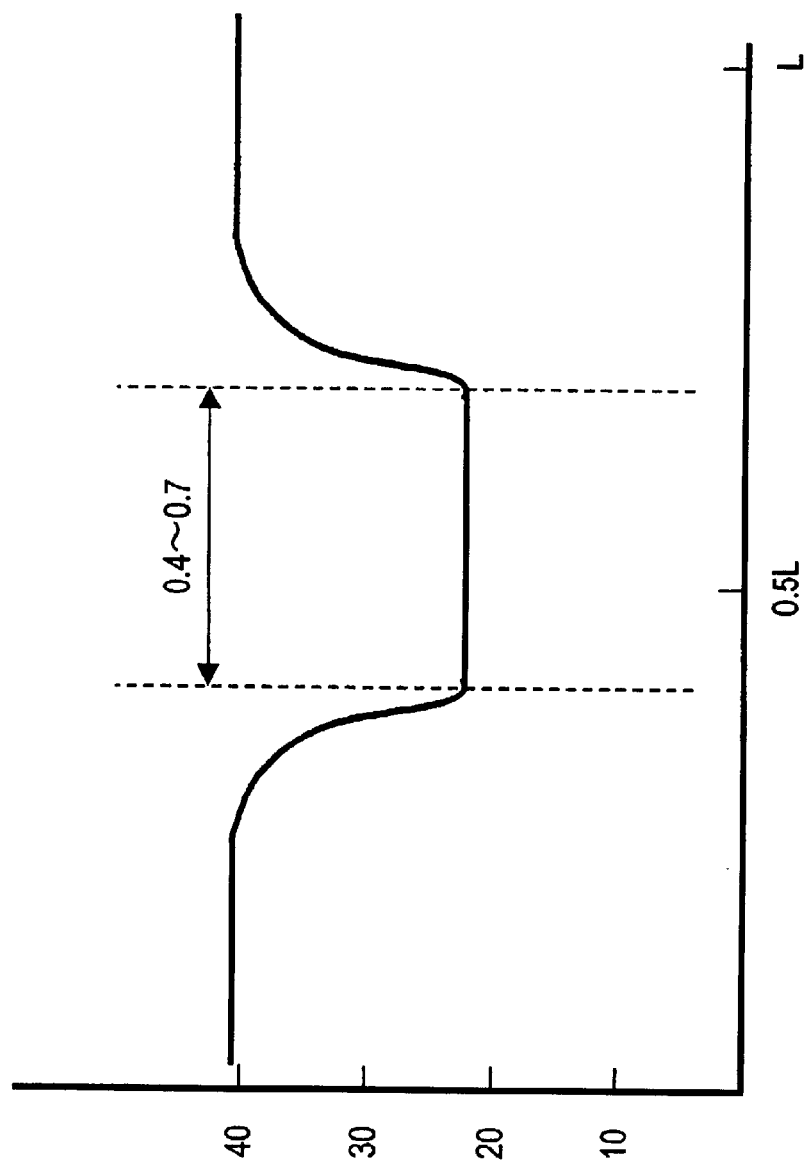
FIG. 22 shows the relation between the distance of an auxiliary electrode and an electrode to which the auxiliary electrode is not connected, and the discharge start voltage in example 3 of the present invention.

In the present invention, by contrast, when the distance between the two electrodes is defined as L, the auxiliary electrode is disposed at a position of 0.4L to 0.7L from an electrode to which the auxiliary electrode is not connected. FIG. 22 shows the relation between the distance of the auxiliary electrode and the electrode to which the auxiliary electrode is not connected, and the discharge start voltage. As FIG. 22 shows, when the distance is shorter than 0.4L, the ionized laser gas recombines, and the effect of reducing the discharge start voltage is not obtained. If the distance is longer than 0.7L, on the other hand, since the distance between the positive electrode and the auxiliary electrode is too long, the discharge start voltage climbs up. Accordingly, an appropriate distance between the auxiliary electrode and the electrode to which the auxiliary electrode is not connected is in a range of 0.4L to 0.7L.

Figure 32:
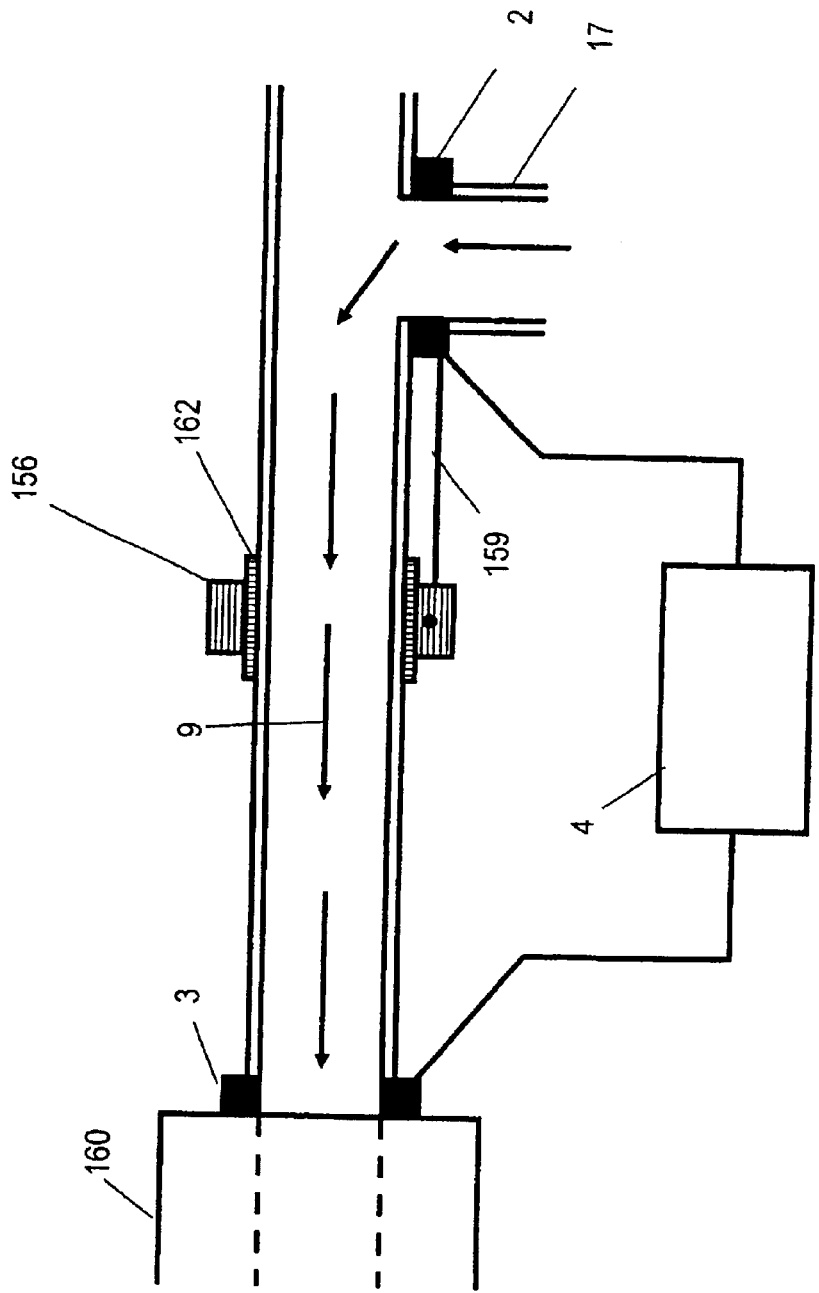
FIG. 32 is a schematic diagram showing configuration of other DT section in prior art.
Figure 33:
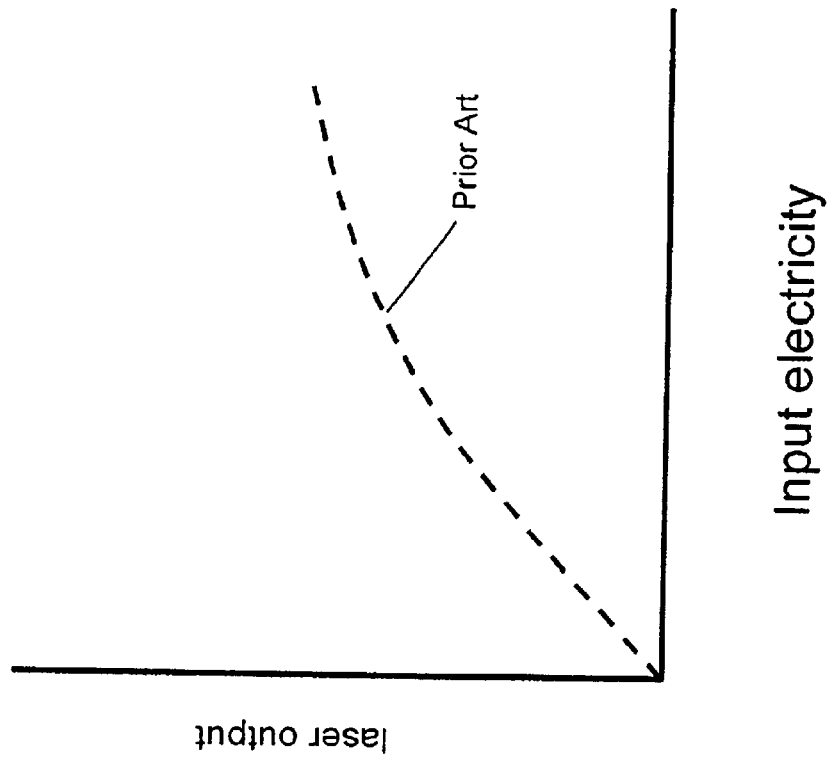
FIG. 33 is a diagram showing the relation between electric input and laser output in prior art.

FIG. 32 shows another representative example of the prior art. Along the outer surface of the DT, a conductor 159 is extended from the electrode 2 to the electrode 3. An auxiliary electrode 156 is provided at the end of the conductor 159 closer to the electrode 3. The auxiliary electrode 156 is bonded to the wall of the DT 1 via an insulating sheet 162 made of a dielectric material. The auxiliary electrode 156 and electrode 3 form a capacitive coupling via the dielectrics. This configuration attempted to ionize a laser gas existing in the path of current, and decrease the discharge start voltage. To increase the effect of lowering the discharge start voltage, it was also attempted to reduce the thickness of the dielectrics, but holes were formed in the wall of the DT during a long time of operation due to a corona discharge. In the present invention, since the hole 55 is opened in the DT 1 in the fitting area of the auxiliary electrode 56 for passing small current upon start of discharge, there is no problem of formation of holes during long time of operation, and it is also excellent in long-term reliability.

Figure 23:
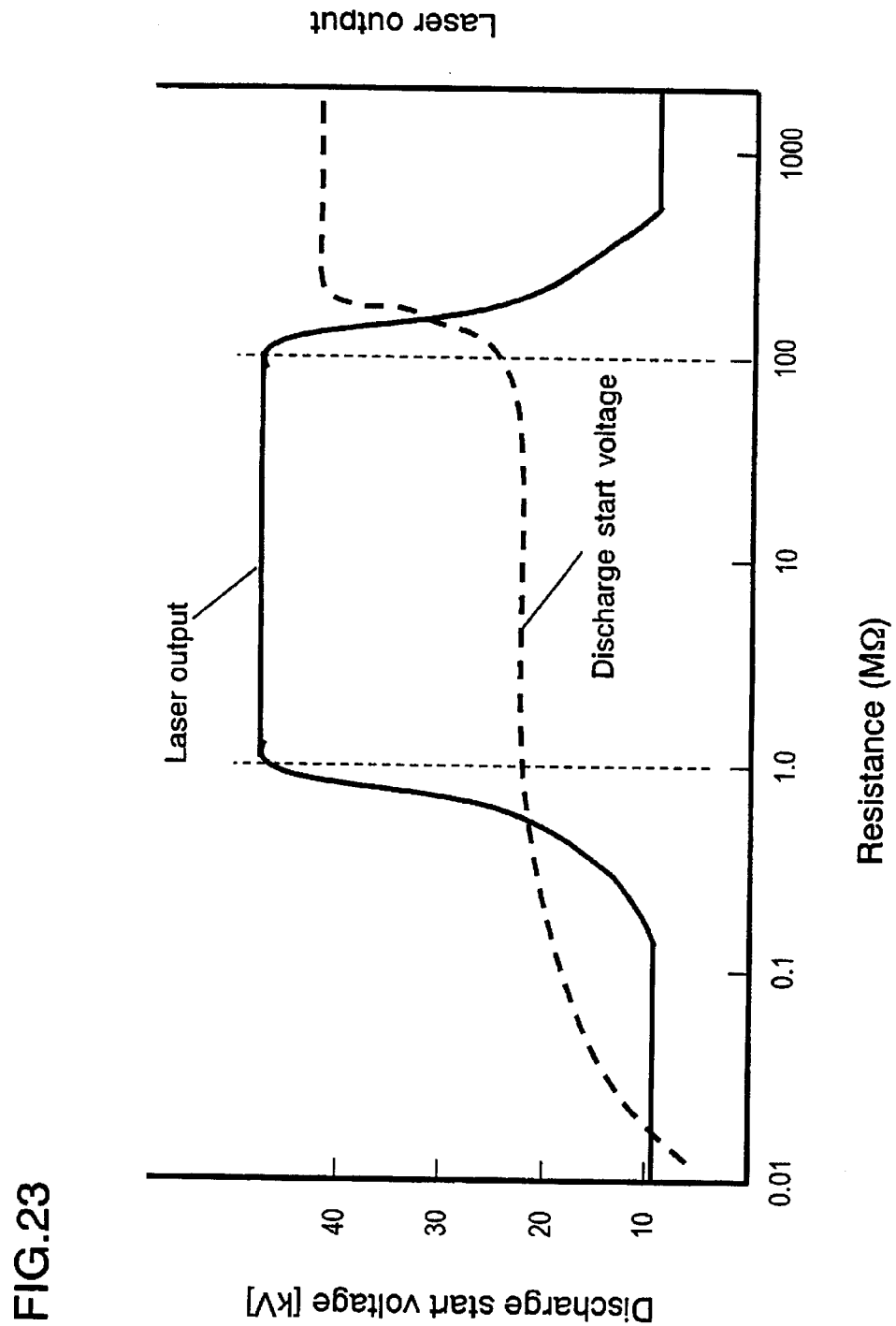
FIG. 23 shows the relation between the resistance of the high resistance resistor coupling the auxiliary electrode and an electrode, the discharge start voltage and laser output in example 3 of the present invention.

FIG. 23 shows the relation between the resistance of the high resistance resistor coupling between the auxiliary electrode 56 and the electrode, and the discharge start voltage and laser output. If the resistance of the high resistance resistor 58 is less than 1 MΩ, too much current flows in the auxiliary electrode, and the discharge in the DA 5 is disturbed. As a result, high laser output is not obtained. On the other hand, if the resistance is larger than 100 MΩ, the effect of the auxiliary electrode is small, and the effect of decreasing the discharge start voltage is not obtained. Besides, the discharge is disturbed by rush current, and the effect of increasing the laser output is not obtained. Therefore, the resistance of the high resistance resistor should be in a range of 1 MΩ or more to 100 MΩ or less.

Thus, in the prior art, the auxiliary electrode had problems in performance and reliability, but in the present invention, the laser output is stabilized by substantial decrease of discharge start voltage, and the long time reliability is obtained.

Figure 24:
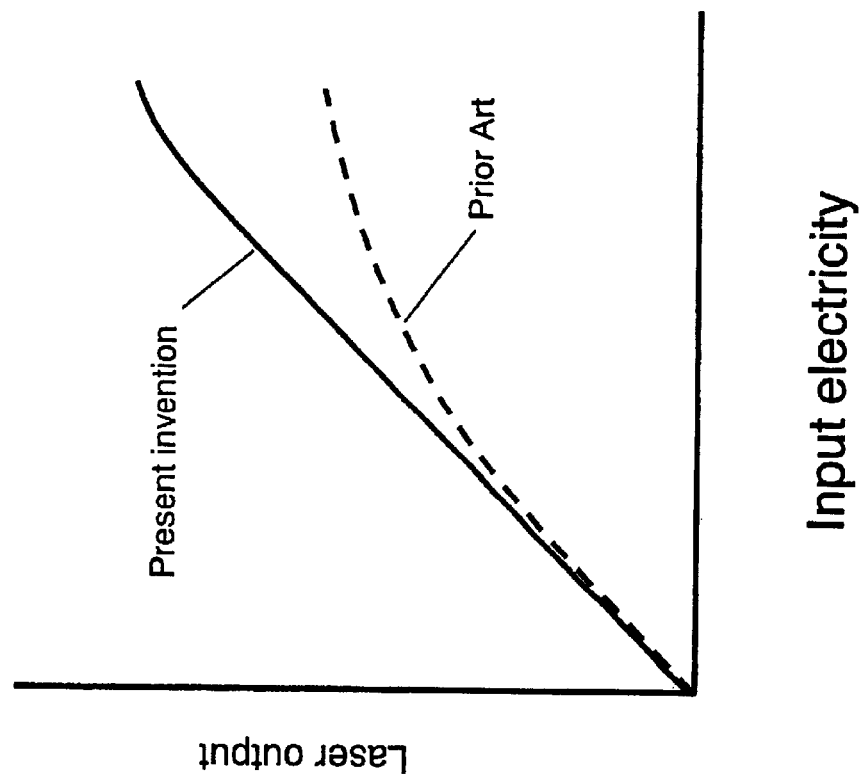
FIG. 24 shows the difference of laser output in example 3 of the present invention and a prior art.

FIG. 24 shows the discharge start voltage vs electric input to the DT and laser output in the embodiment of the present invention and these of the prior art, in which the axis of abscissas denotes the discharge electric input and the axis of ordinate represents the laser output. As shown in FIG. 24, as the electric input to the DT is increased, the effect of the embodiment of the present invention is more clearly expressed. By stabilizing the discharge by a decrease of the discharge start voltage, the laser output is increased substantially as compared with the prior art.

According to the present invention, the discharge is stabilized by substantial decrease of discharge start voltage, and a laser oscillator with an outstanding increase in laser output is provided.

INDUSTRIAL APPLICABILITY

The present invention provides a laser oscillator with a stable optical bench, or a stabilized mirror parallelism, against vacuum force, external force or ambient temperature change, and a stable laser output all the time.

By forming a uniform laser gas flow in the DT, the present invention provides a laser oscillator with a substantially improved laser oscillation efficiency and an increased laser output.

The present invention stabilizes discharge by significantly decreasing the discharge start voltage, and hence a laser oscillator with a notably increased laser output is obtained.

What is claimed is:

1. A laser oscillator comprising:

a discharge tube for exciting a laser medium disposed inside of said discharge tube by applying energy;

a first mirror and a second mirror disposed on an optical axis of a laser beam emitted from the laser medium excited by said discharge tube;

a first mirror holder and a second mirror holder operable to hold said first mirror and said second mirror, respectively;

a plurality of mirror holder connecting members operable to connect said first mirror holder to said second mirror holder;

a discharge tube support operable to support said discharge tube;

a first fixing part operable to fix said first mirror holder to said discharge tube support in a laser beam axial direction and in a perpendicular direction to the laser beam axis, said first fixing part having a degree of freedom in a rotating direction within a plane including the laser beam axial direction;

a second fixing part operable to fix said second mirror holder to the discharge tube support in the perpendicular direction to the laser beam axis, said second fixing part being slidable in the laser beam axial direction; and a plurality of ribs operable to connect said plurality of mirror holder connecting members with said discharge tube support, said ribs being slidable against said plurality of mirror holder connecting members in the perpendicular direction to the laser beam axis.

2. The laser oscillator of claim 1, wherein said ribs are configured to force the plurality of mirror holder connecting members in a mutually central direction.

3. The laser oscillator of claim 1, wherein said ribs are configured to force the plurality of mirror holder connecting members in a mutually departing direction.

4. The laser oscillator of claim 1, wherein said first fixing part comprises a rotary shaft member disposed so that a shaft thereof is perpendicular to the laser beam axis, and a rotary shaft support operable to support the rotary shaft member from the first mirror holder and discharge tube base, while keeping a degree of freedom in a rotating direction in a perpendicular plane with respect to the shaft of the rotary shaft member.

5. The laser oscillator of claim 1, wherein an elastic force is applied in a rotary shaft direction of the first fixing part.

* * * * *

UNITED STATES PATENT AND TRADEMARK OFFICE
CERTIFICATE OF CORRECTION

PATENT NO. : 6,944,200 B2  Page 1 of 1
APPLICATION NO. : 10/680243
DATED : September 13, 2005
INVENTOR(S) : Hiroyuki Hayashikawa et al.

It is certified that error appears in the above-identified patent and that said Letters Patent is hereby corrected as shown below:

Title Page
Item [56], References Cited, col. 2, Other Publications, line 2, "(Amanda Co., Ltd.)" should read --(Amada Co., Ltd.)--.

Signed and Sealed this

Twenty-seventh Day of February, 2007

JON W. DUDAS
*Director of the United States Patent and Trademark Office*